(12) United States Patent
Sietsema et al.

(10) Patent No.: US 12,709,225 B2
(45) Date of Patent: Aug. 18, 2026

(54) SYSTEM AND METHOD FOR CAB ENTRY STEP LINKAGE AND CONTROL

(71) Applicant: CNH INDUSTRIAL AMERICA LLC, New Holland, PA (US)

(72) Inventors: Chad Sietsema, Barnesville, MN (US); Brandon Smith, Casselton, ND (US); John T. Rasset, Barnesville, MN (US); Garrett Lee, New Holland, PA (US)

(73) Assignee: CNH INDUSTRIAL AMERICA LLC, New Holland, PA (US)

( * ) Notice: Subject to any disclaimer, the term of this patent is extended or adjusted under 35 U.S.C. 154(b) by 331 days.

(21) Appl. No.: 18/615,856

(22) Filed: Mar. 25, 2024

(65) Prior Publication Data

US 2025/0296506 A1 Sep. 25, 2025

(51) Int. Cl.
*B60R 3/02* (2006.01)

(52) U.S. Cl.
CPC ............. *B60R 3/02* (2013.01); *B60Y 2200/41* (2013.01)

(58) Field of Classification Search
CPC .............................. B60R 3/02; B60Y 2200/41
See application file for complete search history.

(56) References Cited

U.S. PATENT DOCUMENTS 3,997,183 A 12/1976 Russey
5,996,737 A * 12/1999 Hedley ................. E02F 9/0833 182/86
6,029,775 A * 2/2000 Hedley ..................... B60R 3/02 182/127
6,264,227 B1 7/2001 Johnson et al.
8,002,298 B2 8/2011 Casbolt et al.
8,011,474 B2 9/2011 Boroski et al.
9,539,948 B1 * 1/2017 Presley ..................... B60R 3/02
9,649,984 B2 * 5/2017 Edelen ................... A01B 76/00
9,994,159 B2 * 6/2018 Giesmann ................. E06C 5/24
10,099,622 B2 * 10/2018 Handschke ............... B60R 3/02
10,562,456 B2 2/2020 Lynch et al.
11,130,448 B2 * 9/2021 Bares ........................ B60R 3/02
11,279,290 B2 3/2022 Leitner
11,421,477 B2 8/2022 Simula et al.
11,440,476 B2 9/2022 Reitnouer
(Continued)

FOREIGN PATENT DOCUMENTS

EP 3 560 788 B1 10/2019

*Primary Examiner* — Erez Gurari
(74) *Attorney, Agent, or Firm* — Foley & Lardner LLP

(57) ABSTRACT

A device includes a platform and a staircase moveable between a retracted state and an extended state. The staircase has steps including a retractable step and a support segment. A linkage system includes an actuator that moves the staircase from the retracted and extended state, a sensor detecting the staircase state and a vehicle condition, and an extension bracket coupling the staircase and platform. A controller determines the staircase state, determines an articulation angle, compares the articulation angle to an articulation angle threshold, in response to the articulation angle exceeding the threshold, causes the staircase to move to the retracted state, detects a vehicle operation event, in response to detecting the operation event, causes the staircase to move to the retracted state, detects a vehicle shut-down event, and in response to detecting the shut-down event causes the staircase to move to the extended state.

20 Claims, 12 Drawing Sheets

(56) References Cited

U.S. PATENT DOCUMENTS

2001/0030081 A1* 10/2001 Morimoto ................. B60R 3/02 182/127
2004/0159492 A1* 8/2004 Hedley ..................... B60R 3/02 182/86
2008/0157500 A1* 7/2008 Raley ...................... E06C 1/387 182/127
2009/0294213 A1* 12/2009 Kim .......................... E06C 5/08 182/127
2022/0063502 A1 3/2022 Leitner et al.
2022/0134958 A1 5/2022 Wubben et al.
2022/0185189 A1* 6/2022 Houston ............... E04F 11/022
2025/0065808 A1* 2/2025 Ebbenga ................... B60R 3/02

* cited by examiner

SYSTEM AND METHOD FOR CAB ENTRY STEP LINKAGE AND CONTROL

BACKGROUND

The present disclosure relates generally to cab step system for a vehicle. More specifically, the present disclosure relates to cab step system selectively transitionable between an extended state and a retracted state.

SUMMARY

One embodiment relates to a cab step system. In some aspects, the techniques described herein relate to a cab step system for a vehicle, the system including a platform coupled to the vehicle; a staircase selectively moveable between a retracted state and an extended state, the staircase including: a plurality of steps including a retractable step, at least one support segment coupling together the steps of the plurality of steps, a linkage system, the linkage system including: an actuator configured to selectively move the staircase from the retracted state to the extended state; at least one sensor configured to detect a state of the staircase and a condition of the vehicle; a moveable extension bracket coupling the staircase to the platform; a controller, the controller including one or more processors including one or more memory devices coupled to the one or more processors, the one or more memory devices configured to store instructions thereon that, when executed by the one or more processors, cause the one or more processors to: receive a first indication that the staircase is in at least one of the retracted state or the extended state, receive a second indication of an articulation angle of the vehicle, compare the articulation angle to an articulation angle threshold, in response to the articulation angle exceeding the articulation angle threshold, cause the staircase to move to or stay in the retracted state, receive a third indication of a vehicle operation event, in response receiving the third indication of the vehicle operation event, cause the staircase to move to or stay in the retracted state, receive a fourth indication of a vehicle shut-down event, and in response to receiving the fourth indication of the vehicle shut-down event and the articulation angle falling below the articulation angle threshold, cause the staircase to move to or stay in the extended state.

In some aspects, the techniques described herein relate to a cab step system, wherein the condition of the vehicle includes the articulation angle of a tractive assembly of the vehicle; the at least one sensor includes a proximity sensor configured to receive a fifth indication of a distance between the staircase and the platform, a limit switch configured to receive a sixth indication that the staircase is in the retracted state or the extended state, an articulation sensor configured to receive the second indication of the articulation angle; and the first indication that the staircase is in at least one of the retracted state or the extended state is based on the fifth indication of the proximity sensor and the sixth indication of the limit switch.

In some aspects, the techniques described herein relate to a system, further including an overload sensor configured to receive a seventh indication of a load on the linkage system; wherein the one or more memory devices are configured to store further instructions thereon that, when executed by the one or more processors, cause the one or more processors to receive the seventh indication of the load on the linkage system, compare the seventh indication with an overload threshold, and in response to the seventh indication exceeding the overload threshold, reset the staircase to one of the retracted state or the extended state.

In some aspects, the techniques described herein relate to a system, wherein the one or more memory devices are configured to store further instructions thereon that, when executed by the one or more processors, cause the one or more processors to: detect a fault event based on the at least one of the fifth indication of the proximity sensor or the sixth indication of the limit switch, and in response to detecting the fault event, activate an override subassembly to move the staircase to one of the retracted state or the extended state.

In some aspects, the techniques described herein relate to a system, wherein the vehicle operation event includes at least one of shifting the vehicle out of a parked state, moving the vehicle via a prime mover, or performing a crop collecting operation via the vehicle.

In some aspects, the techniques described herein relate to a system, wherein the vehicle shut-down event includes at least one of shifting the vehicle to a park state, powering off a prime mover of the vehicle.

In some aspects, the techniques described herein relate to a system, wherein the one or more memory devices are configured to store further instructions thereon that, when executed by the one or more processors, cause the one or more processors to set the linkage system to one of a low power state or a high power state, detect a vehicle start-up event including at least one of an operator being located in a seat of a cab of the vehicle, a key of the vehicle turning to a run position, the key of the vehicle entering the cab, the key of the vehicle being inserted into the vehicle, or a start of the prime mover, after detecting the vehicle start-up event, set the linkage system to the high power state, and after detecting the vehicle shut-down event, set the linkage system to the low power state.

In some aspects, the techniques described herein relate to a vehicle including a frame; a front tractive assembly coupled to the frame, the front tractive assembly including a front axle; a rear tractive assembly coupled to the frame, the rear tractive assembly including a rear axle; a prime mover coupled to the frame and configured to drive the front tractive assembly and the rear tractive assembly to propel the vehicle; an articulation sensor configured to collect data indicating an articulation angle of at least one of the front tractive assembly or the rear tractive assembly; a platform coupled to the frame of the vehicle; a staircase selectively moveable between a retracted state and an extended state, the staircase including a plurality of steps including a retractable step, at least one support segment coupling together the steps of the plurality of steps, a linkage system, the linkage system including: an actuator configured to selectively move the staircase from the retracted state to the extended state; at least one sensor configured to detect a state of the staircase; a moveable extension bracket coupling the staircase to the platform; a controller, the controller including one or more processors including one or more memory devices coupled to the one or more processors, the one or more memory devices configured to store instructions thereon that, when executed by the one or more processors, cause the one or more processors to: receive a first indication that the staircase is in at least one of the retracted state or the extended state, receive a second indication of the articulation angle of the vehicle, compare the articulation angle to an articulation angle threshold, in response to the articulation angle exceeding the articulation angle threshold, cause the staircase to move to or stay in the retracted state, receive a third indication of a vehicle operation event, in response receiving the third indication of the vehicle operation event, cause the staircase to move to or stay in the retracted state, receive a fourth indication of a vehicle shut-down event, and in response to receiving the fourth indication of the vehicle shut-down event and the articulation angle falling below the articulation angle threshold, cause the staircase to move to or stay in the extended state.

In some aspects, the techniques described herein relate to a vehicle, wherein the at least one sensor includes: a proximity sensor configured to receive a fifth indication of a distance between the staircase and the platform, a limit switch configured to receive a sixth indication that the staircase is in the retracted state or the extended state; and the first indication that the staircase is in at least one of the retracted state or the extended state is based on the fifth indication of the proximity sensor and the sixth indication of the limit switch.

In some aspects, the techniques described herein relate to a vehicle, further including an overload sensor configured to receive a seventh indication of a load on the linkage system; wherein the one or more memory devices are configured to store further instructions thereon that, when executed by the one or more processors, cause the one or more processors to: receive the seventh indication of the load on the linkage system, compare the seventh indication with an overload threshold, and in response to the seventh indication exceeding the overload threshold, reset the staircase to one of the retracted state or the extended state.

In some aspects, the techniques described herein relate to a vehicle, wherein the one or more memory devices are configured to store further instructions thereon that, when executed by the one or more processors, cause the one or more processors to detect a fault event based on the at least one of the fifth indication of the proximity sensor or the sixth indication of the limit switch, and in response to detecting the fault event, activate an override subassembly to move the staircase to one of the retracted state or the extended state.

In some aspects, the techniques described herein relate to a vehicle, wherein the one or more memory devices are configured to store further instructions thereon that, when executed by the one or more processors, cause the one or more processors to detect a fault event based on the at least one of the fifth indication of the proximity sensor or the sixth indication of the limit switch, and in response to detecting the fault event, activate an override subassembly to move the staircase to one of the retracted state or the extended state.

In some aspects, the techniques described herein relate to a vehicle, wherein the vehicle operation event includes at least one of shifting the vehicle out of a parked state, moving the vehicle via the prime mover, or performing a crop collecting operation via the vehicle; and the vehicle shut-down event includes at least one of shifting the vehicle to a park state, powering off the prime mover of the vehicle.

In some aspects, the techniques described herein relate to a vehicle, wherein the one or more memory devices are configured to store further instructions thereon that, when executed by the one or more processors, cause the one or more processors to set the linkage system to one of a low power state or a high power state, detect a vehicle start-up event including at least one of an operator being located in a seat of a cab of the vehicle, a key of the vehicle turning to a run position, the key of the vehicle entering the cab, the key of the vehicle being inserted into the vehicle, or a start of the prime mover, after detecting the vehicle start-up event, set the linkage system to the high power state, and after detecting the vehicle shut-down event, set the linkage system to the low power state.

In some aspects, the techniques described herein relate to a method for operating a cab step system of a vehicle, the method including receiving, by a controller, a first indication of a state of a staircase of the vehicle, the staircase coupled to a platform of the vehicle and selectively moveable between a retracted state and an extended state; receiving, by the controller, a second indication of an articulation angle of a tractive element of the vehicle; comparing, by the controller, the articulation angle to an articulation angle threshold; in response to the articulation angle exceeding the articulation angle threshold, causing, by the controller, the staircase to move to or stay in the retracted state; receiving, by the controller, a third indication of a vehicle operation event; in response receiving the third indication of the vehicle operation event, causing, by the controller, the staircase to move to or stay in the retracted state; receiving, by the controller, a fourth indication of a vehicle shut-down event; and in response to receiving the fourth indication of the vehicle shut-down event and the articulation angle falling below the articulation angle threshold, causing, by the controller, the staircase to move to or stay in the extended state.

In some aspects, the techniques described herein relate to a method, further including receiving, by the controller, a fifth indication of a distance between the staircase and the platform; receiving, by the controller, a sixth indication from a limit switch that the staircase is in the retracted state, the extended state, or a transition state; and determining, by the controller, the state of the staircase based on the fifth indication and the sixth indication.

In some aspects, the techniques described herein relate to a method, further including receiving, by the controller, a seventh indication of a load on the staircase; comparing, by the controller, the seventh indication with an overload threshold; and in response to the seventh indication exceeding the overload threshold, resetting, by the controller, the staircase to one of the retracted state or the extended state.

In some aspects, the techniques described herein relate to a method, further including detecting, by the controller, a fault event based on at least one of the fifth indication or the sixth indication; and in response to detecting the fault event, activating, by the controller, an override subassembly to move the staircase to one of the retracted state or the extended state.

In some aspects, the techniques described herein relate to a method, wherein the vehicle operation event includes at least one of shifting the vehicle out of a parked state, moving the vehicle via a prime mover, or performing a crop collecting operation via the vehicle; and the vehicle shut-down event includes at least one of shifting the vehicle to the parked state, or powering off the prime mover of the vehicle.

In some aspects, the techniques described herein relate to a method, further including setting, by the controller, an actuator to one of a low power state or a high power state; detecting, by the controller, a vehicle start-up event including at least one of an operator being located in a seat of a cab of the vehicle, a key of the vehicle turning to a run position, the key of the vehicle entering the cab, the key of the vehicle being inserted into the vehicle, or a start of the prime mover; after detecting the vehicle start-up event, setting, by the controller, the actuator to the high power state; and after detecting the vehicle shut-down event, setting, by the controller, the actuator to the low power state.

This summary is illustrative only and is not intended to be in any way limiting. Other aspects, inventive features, and advantages of the devices or processes described herein will become apparent in the detailed description set forth herein, taken in conjunction with the accompanying figures, wherein like reference numerals refer to like elements.

DETAILED DESCRIPTION

Before turning to the figures, which illustrate certain exemplary embodiments in detail, it should be understood that the present disclosure is not limited to the details or methodology set forth in the description or illustrated in the figures. It should also be understood that the terminology used herein is for the purpose of description only and should not be regarded as limiting.

According to an exemplary embodiment, a cab step system may be configured to set a staircase to a retracted state, an extended state, or a transition state such that the state of the staircase increases operator comfort when entering and exiting the vehicle and minimizes the profile of the staircase while the vehicle is operating. For example, the cab step system may set the staircase to the extended state when prioritizing the ease of operator ingress/egress (e.g., set the staircase to the extended state when the operator is expected to enter/leave the vehicle) to provide the operator with an ingress/egress path that is less steep and provides more horizontal stepping surfaces compared to the staircase in the retracted state or a fixed staircase. Similarly, the cab step system may set the staircase to the retracted state when prioritizing performance of the vehicle, reducing the width of the vehicle, or the like (e.g., set the staircase to the retracted state when the vehicle is travelling at speed/operating because the operator is unlikely to exit the vehicle until the vehicle is stopped/parked). Beneficially, this may allow for an increased size of an operator entry platform, allow for decreased step steepness while the staircase is likely to be used by the operator and increased step steepness (e.g., a slimmer step profile and less likelihood of collision) when the staircase is not likely to be used by the operator. Further, the cab step system increases spatial efficiency of vehicle by utilizing space beneath a platform into the cab and shortens the staircase by one step during operation, thereby improving ground clearance of staircase.

Overall Vehicle

Figure 1A:
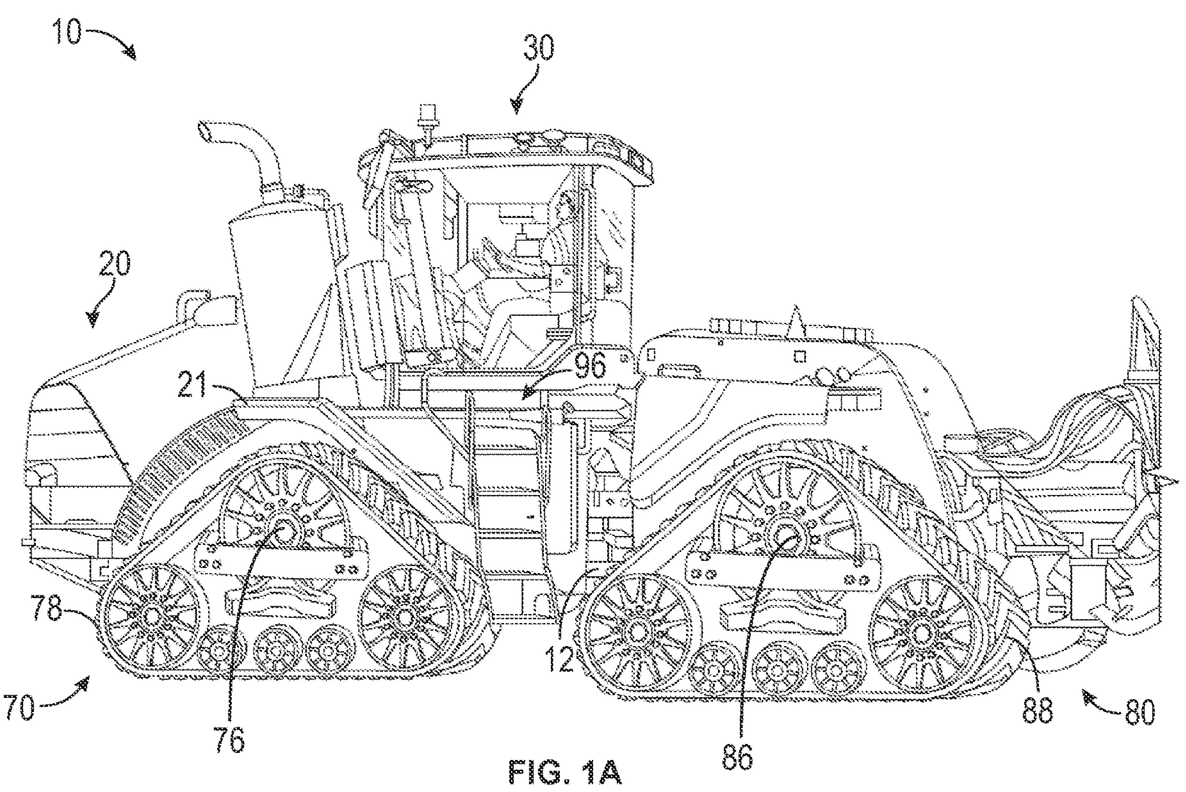
FIGS. 1A-B show perspective views of example vehicles, according to an exemplary embodiment.
Figure 1B:
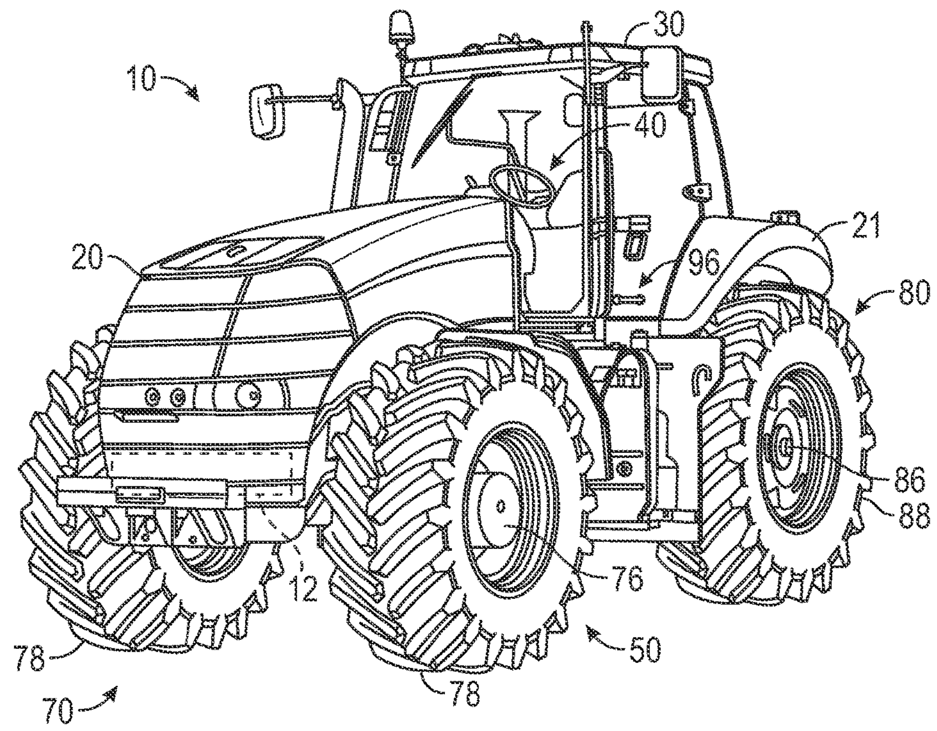
Figure 2:
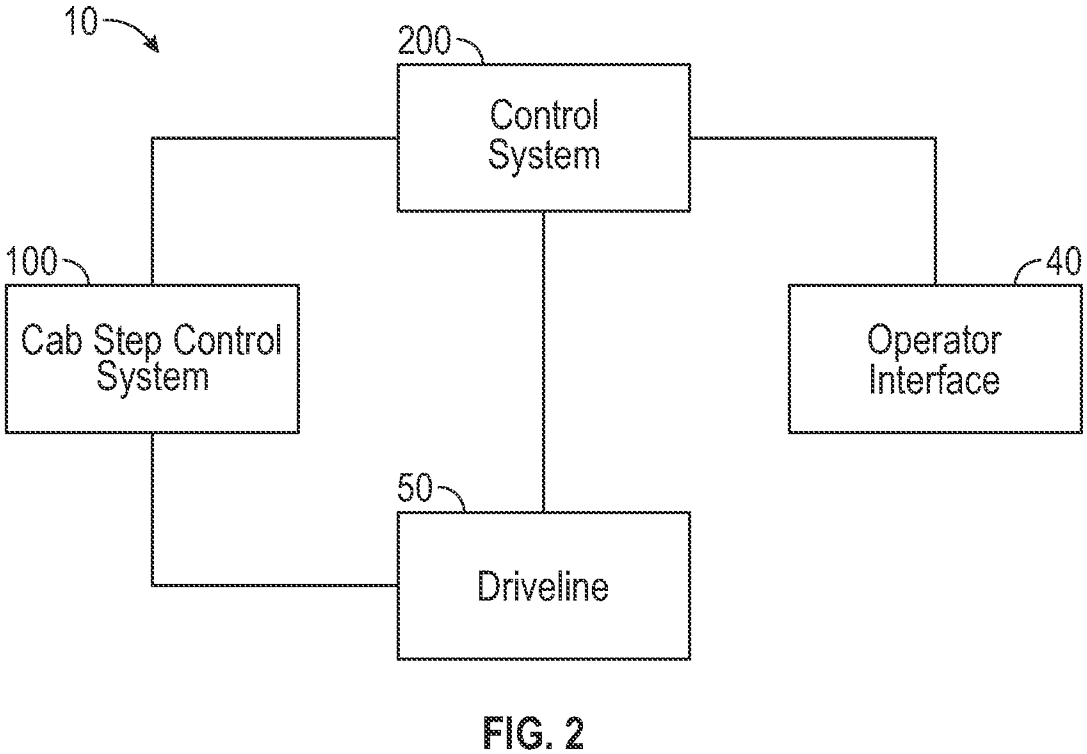
FIG. 2 is a schematic block diagram of a vehicle of FIG. 1, according to an exemplary embodiment.
Figure 3:
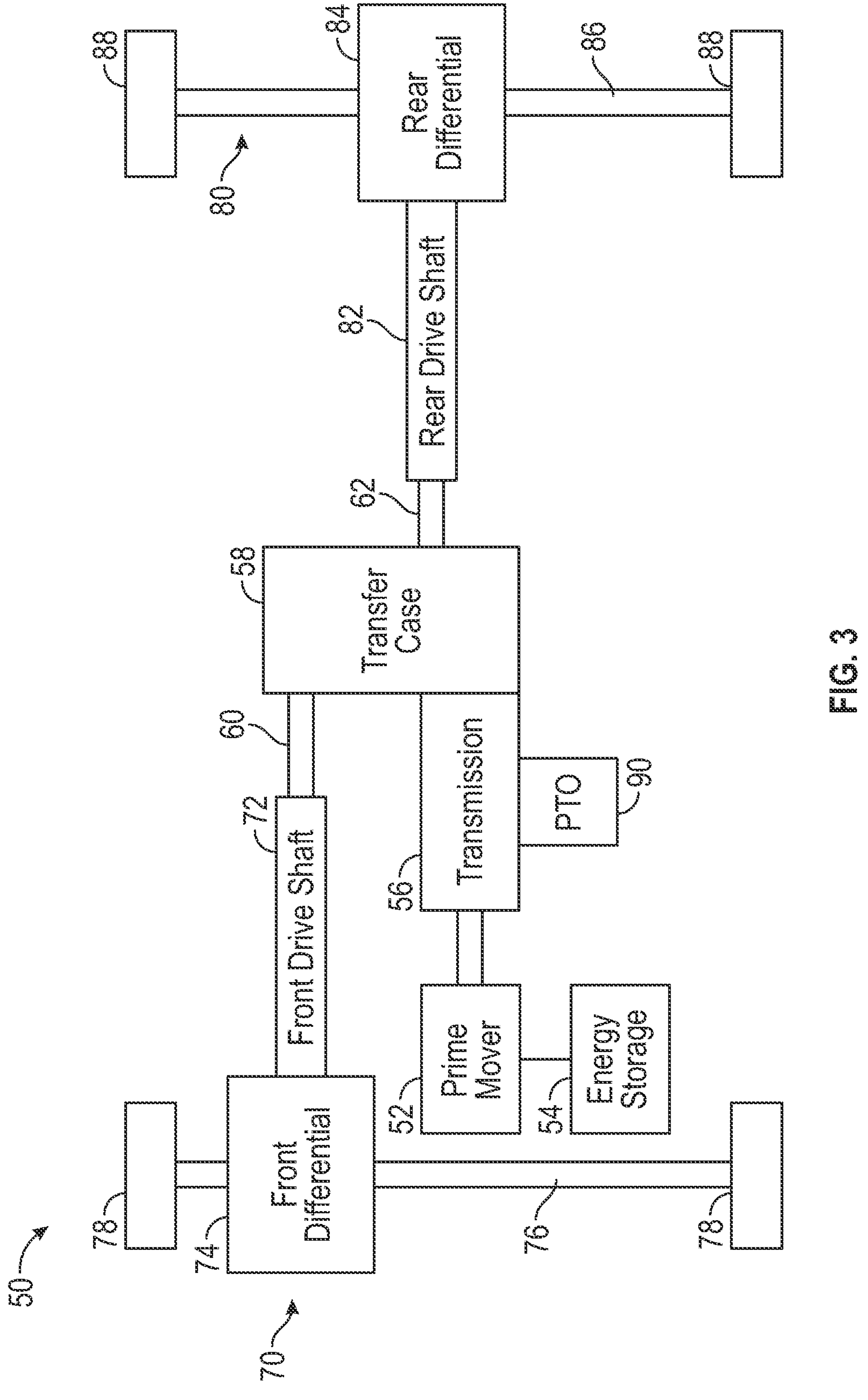
FIG. 3 is a schematic block diagram of a driveline of a vehicle of FIG. 1, according to an exemplary embodiment.

According to the exemplary embodiment shown in FIGS. 1-3, a machine or vehicle, shown as vehicle 10, includes a chassis, shown as frame 12; a body assembly, shown as body 20 including one or more fenders 21, coupled to the frame 12 and having an occupant portion or section, shown as cab 30; operator input and output devices, shown as operator interface 40, that are disposed within the cab 30; a drivetrain, shown as driveline 50, coupled to the frame 12 and at least partially disposed under the body 20; a vehicle braking system, shown as braking system 92, coupled to one or more components of the driveline 50 to facilitate selectively braking the one or more components of the driveline 50; and a cab entry environment 96, configured to allow an operator of the vehicle 10 to enter and exit the cab 30. In other embodiments, the vehicle 10 includes more or fewer components.

The chassis of the vehicle 10 may include a structural frame (e.g., the frame 12) formed from one or more frame members coupled to one another (e.g., as a weldment). Additionally, or alternatively, the chassis may include a portion of the driveline 50. By way of example, a component of the driveline 50 (e.g., the transmission 56 shown in FIG. 3) may include a housing of sufficient thickness to provide the component with strength to support other components of the vehicle 10.

According to an exemplary embodiment, the vehicle 10 is an off-road machine or vehicle. In some embodiments, the off-road machine or vehicle is an agricultural machine or vehicle such as a tractor, a telehandler, a front loader, a combine harvester, a grape harvester, a forage harvester, a sprayer vehicle, a speedrower, and/or another type of agricultural machine or vehicle. In some embodiments, the off-road machine or vehicle is a construction machine or vehicle such as a skid steer loader, an excavator, a backhoe loader, a wheel loader, a bulldozer, a telehandler, a motor grader, and/or another type of construction machine or vehicle. In some embodiments, the vehicle 10 includes one or more attached implements and/or trailed implements such as a front mounted mower, a rear mounted mower, a trailed mower, a tedder, a rake, a baler, a plough, a cultivator, a rotavator, a tiller, a harvester, and/or another type of attached implement or trailed implement.

According to an exemplary embodiment, the cab 30 is configured to provide seating for an operator (e.g., a driver, etc.) of the vehicle 10. In some embodiments, the cab 30 is configured to provide seating for one or more passengers of the vehicle 10. According to an exemplary embodiment, the operator interface 40 is configured to provide an operator with the ability to control one or more functions of and/or provide commands to the vehicle 10 and the components thereof (e.g., turn on, turn off, drive, turn, brake, engage various operating modes, raise/lower an implement, etc.). The operator interface 40 may include one or more displays and one or more input devices. The one or more displays may be or include a touchscreen, an LCD display, a LED display, a speedometer, gauges, warning lights, etc. The one or more input device may be or include a steering wheel, a joystick, buttons, switches, knobs, levers, an accelerator pedal, a brake pedal, etc.

For example, the operator interface 40 may include one or more knobs, levers, buttons, switches and the like (e.g., arranged on a control panel, arranged on a dashboard, located on or near the one or more vents, located on a center console, etc.) to control functionalities related to the cab entry environment 96 such as a position/state of one or more steps leading to the cab 30. In other embodiments, a touch-screen display may be included to list control settings that allow the operator to change/select a position, angle, height, slope, ground clearance, or the like of one or more components of the cab entry environment 96 (e.g., a stair, a staircase, etc.) relative to the cab 30, the vehicle 10, the body 20, or components of the body such as one or more fenders 21. The operator interface 40 may also have additional features such as a mode selector for selecting between different states of the cab entry environment 96 such as an "extended" state, a "retracted" state, an intermediate/transition state, etc.), toggling lighting controls related to the cab step environment, (for illuminate the stairs, a platform outside the cab, etc.) or the like.

The cab entry environment 96 may be controlled by one or more controllers of the vehicle 10 such that features, positions, states, and the like of the cab entry environment 96 may be changed, activated, deactivated, etc. without receiving manual commands from the operator. However, the operator interface 40 may also include controls represented by dials, levers, latches, buttons, or other suitable controls that allow the operator to manually select/set a feature, position, or quality of the cab entry environment 96. For example, the cab 30 may include knobs, dials, and the like configured to override a state of a cab entry environment 96 and force the cab entry environment 96 to a position that allows easier egress/ingress (e.g., an extended state). Specifically, in an emergency scenario or if an operator needs to quickly leave the cab 30, the operator interface 40 may include one or more override features configured to position the steps to the cab 30 in an extended state or a state that increases the speed/ease at which an operator may descend/ascend from the cab 30. By adjusting these controls, the operator can increase or decrease the angle of inclination of components of the cab entry environment 96 to achieve a target steepness (e.g., angle of inclination), length, or rise/run between steps of an ingress/egress path from the cab 30.

One or more of these operator-selected controls or settings may allow an operator to override an automatic, semi-automatic, electronic, hydraulic, mechanically actuated, etc. cab step control system 100. For example, the cab step control system 100 may be configured to selectively transition, toggle, set, or otherwise move the cab entry environment 96 between a retracted state and an extended state in response to various conditions of the vehicle 10 and/or conditions of the surroundings of the vehicle 10. For example, the cab step control system 100 may preferentially place the cab entry environment 96 or a staircase thereof in an extended state when the vehicle 10 is not in motion such that an operator can enter the cab 30 via an ingress route having a lower steepness compared to an ingress route of the staircase in a retracted state. Further, the cab step control system 100 may toggle, set, or otherwise control the state of the cab entry environment 96 to prevent a collision between the cab entry environment 96 and a component of the vehicle 10. For example, for a staircase located on a left side of the vehicle 10 and proximate to a rear tractive element 88, a left turn of a steering wheel or guidance system may displace the rear tractive assembly 80 or the rear tractive element 88 towards the staircase. In some embodiments, the rear tractive element 88 may collide with the staircase if the staircase is in an extended state but may not collide with the staircase if the staircase is in a retracted state. Accordingly, the cab step control system 100 may be configured to move the staircase to the retracted state to avoid colliding with the rear tractive element 88 as the rear tractive element turns and approaches the staircase.

Even further, to reduce a width/width profile of the vehicle 10 during movement, the cab step control system 100 may toggle the cab entry environment 96 to a retracted state where a step, staircase, ramp, or the like is brought closer to the vehicle 10 and the angle of entry is increased such that the operator must perform a relatively steep ascent/descent (e.g., the angle of inclination is 10 degrees or less from a vertical plane, 13 degrees from the vertical plane, etc.) when traversing the cab entry environment 96 in the retracted state. The operator controls may include a manual control that overrides the cab step control system 100 and forces the cab entry environment 96 to, for example, move to the extended state even though the vehicle 10 is still moving. Accordingly, the angle of incline may be less (e.g., greater than 13 degrees from the vertical plane, 20 degrees from the vertical plane, etc.) than in the retracted state and the operator may experience a reduced risk of injury during the ascent/descent (e.g., the likelihood of falling down the cab entry environment 96 may decrease as the steepness of the egress route/staircase decreases).

According to an exemplary embodiment, the driveline 50 is configured to propel the vehicle 10. As shown in FIG. 3, the driveline 50 includes a primary driver, shown as prime mover 52, and an energy storage device, shown as energy storage 54. In some embodiments, the driveline 50 is a conventional driveline whereby the prime mover 52 is an internal combustion engine and the energy storage 54 is a fuel tank. The internal combustion engine may be a spark-ignition internal combustion engine or a compression-ignition internal combustion engine that may use any suitable fuel type (e.g., diesel, ethanol, gasoline, natural gas, propane, etc.). In some embodiments, the driveline 50 is an electric driveline whereby the prime mover 52 is an electric motor and the energy storage 54 is a battery system. In some embodiments, the driveline 50 is a fuel cell electric driveline whereby the prime mover 52 is an electric motor and the energy storage 54 is a fuel cell (e.g., that stores hydrogen, that produces electricity from the hydrogen, etc.). In some embodiments, the driveline 50 is a hybrid driveline whereby (i) the prime mover 52 includes an internal combustion engine and an electric motor/generator and (ii) the energy storage 54 includes a fuel tank and/or a battery system.

As shown in FIG. 3, the driveline 50 includes a transmission device (e.g., a gearbox, a continuous variable transmission ("CVT"), etc.), shown as transmission 56, coupled to the prime mover 52; a power divider, shown as transfer case 58, coupled to the transmission 56; a first tractive assembly, shown as front tractive assembly 70, coupled to a first output of the transfer case 58, shown as front output 60; and a second tractive assembly, shown as rear tractive assembly 80, coupled to a second output of the transfer case 58, shown as rear output 62. According to an exemplary embodiment, the transmission 56 has a variety of configurations (e.g., gear ratios, etc.) and provides different output speeds relative to a mechanical input received thereby from the prime mover 52. In some embodiments (e.g., in electric driveline configurations, in hybrid driveline configurations, etc.), the driveline 50 does not include the transmission 56. In such embodiments, the prime mover 52 may be directly coupled to the transfer case 58. According to an exemplary embodiment, the transfer case 58 is configured to facilitate driving both the front tractive assembly 70 and the rear tractive assembly 80 with the prime mover 52 to facilitate front and rear drive (e.g., an all-wheel-drive vehicle, a four-wheeldrive vehicle, etc.). In some embodiments, the transfer case 58 facilitates selectively engaging rear drive only, front drive only, and both front and rear drive simultaneously. In some embodiments, the transmission 56 and/or the transfer case 58 facilitate selectively disengaging the front tractive assembly 70 and the rear tractive assembly 80 from the prime mover 52 (e.g., to permit free movement of the front tractive assembly 70 and the rear tractive assembly 80 in a neutral mode of operation). In some embodiments, the driveline 50 does not include the transfer case 58. In such embodiments, the prime mover 52 or the transmission 56 may directly drive the front tractive assembly 70 (i.e., a front-wheel-drive vehicle) or the rear tractive assembly 80 (i.e., a rear-wheel-drive vehicle).

As shown in FIGS. 1 and 3, the front tractive assembly 70 includes a first drive shaft, shown as front drive shaft 72, coupled to the front output 60 of the transfer case 58; a first differential, shown as front differential 74, coupled to the front drive shaft 72; a first axle, shown front axle 76, coupled to the front differential 74; and a first pair of tractive elements, shown as front tractive elements 78, coupled to the front axle 76. In some embodiments, the front tractive assembly 70 includes a plurality of front axles 76. In some embodiments, the front tractive assembly 70 does not include the front drive shaft 72 or the front differential 74 (e.g., a rear-wheel-drive vehicle). In some embodiments, the front drive shaft 72 is directly coupled to the transmission 56 (e.g., in a front-wheel-drive vehicle, in embodiments where the driveline 50 does not include the transfer case 58, etc.) or the prime mover 52 (e.g., in a front-wheel-drive vehicle, in embodiments where the driveline 50 does not include the transfer case 58 or the transmission 56, etc.). The front axle 76 may include one or more components.

As shown in FIGS. 1 and 3, the rear tractive assembly 80 includes a second drive shaft, shown as rear drive shaft 82, coupled to the rear output 62 of the transfer case 58; a second differential, shown as rear differential 84, coupled to the rear drive shaft 82; a second axle, shown rear axle 86, coupled to the rear differential 84; and a second pair of tractive elements, shown as rear tractive elements 88, coupled to the rear axle 86. In some embodiments, the rear tractive assembly 80 includes a plurality of rear axles 86. In some embodiments, the rear tractive assembly 80 does not include the rear drive shaft 82 or the rear differential 84 (e.g., a front-wheel-drive vehicle). In some embodiments, the rear drive shaft 82 is directly coupled to the transmission 56 (e.g., in a rear-wheel-drive vehicle, in embodiments where the driveline 50 does not include the transfer case 58, etc.) or the prime mover 52 (e.g., in a rear-wheel-drive vehicle, in embodiments where the driveline 50 does not include the transfer case 58 or the transmission 56, etc.). The rear axle 86 may include one or more components. According to the exemplary embodiment shown in FIG. 1*b*, the front tractive elements 78 and the rear tractive elements 88 are structured as wheels. In other embodiments, such as in FIG. 1*a* the front tractive elements 78 and the rear tractive elements 88 are otherwise structured (e.g., tracks, etc.). In some embodiments, the front tractive elements 78 and the rear tractive elements 88 are both steerable. In other embodiments, only one of the front tractive elements 78 or the rear tractive elements 88 is steerable. In still other embodiments, both the front tractive elements 78 and the rear tractive elements 88 are fixed and not steerable.

In some embodiments, the driveline 50 includes a plurality of prime movers 52. By way of example, the driveline 50 may include a first prime mover 52 that drives the front tractive assembly 70 and a second prime mover 52 that drives the rear tractive assembly 80. By way of another example, the driveline 50 may include a first prime mover 52 that drives a first one of the front tractive elements 78, a second prime mover 52 that drives a second one of the front tractive elements 78, a third prime mover 52 that drives a first one of the rear tractive elements 88, and/or a fourth prime mover 52 that drives a second one of the rear tractive elements 88. By way of still another example, the driveline 50 may include a first prime mover that drives the front tractive assembly 70, a second prime mover 52 that drives a first one of the rear tractive elements 88, and a third prime mover 52 that drives a second one of the rear tractive elements 88. By way of yet another example, the driveline 50 may include a first prime mover that drives the rear tractive assembly 80, a second prime mover 52 that drives a first one of the front tractive elements 78, and a third prime mover 52 that drives a second one of the front tractive elements 78. In such embodiments, the driveline 50 may not include the transmission 56 or the transfer case 58.

As shown in FIG. 3, the driveline 50 includes a power-take-off ("PTO"), shown as PTO 90. While the PTO 90 is shown as being an output of the transmission 56, in other embodiments the PTO 90 may be an output of the prime mover 52, the transmission 56, and/or the transfer case 58. According to an exemplary embodiment, the PTO 90 is configured to facilitate driving an attached implement and/or a trailed implement of the vehicle 10. In some embodiments, the driveline 50 includes a PTO clutch positioned to selectively decouple the driveline 50 from the attached implement and/or the trailed implement of the vehicle 10 (e.g., so that the attached implement and/or the trailed implement is only operated when desired, etc.).

According to an exemplary embodiment, the braking system 92 (represented as box 92 in FIG. 10) includes one or more brakes (e.g., disc brakes, drum brakes, in-board brakes, axle brakes, etc.) positioned to facilitate selectively braking (i) one or more components of the driveline 50 and/or (ii) one or more components of a trailed implement. In some embodiments, the one or more brakes include (i) one or more front brakes positioned to facilitate braking one or more components of the front tractive assembly 70 and (ii) one or more rear brakes positioned to facilitate braking one or more components of the rear tractive assembly 80. In some embodiments, the one or more brakes include only the one or more front brakes. In some embodiments, the one or more brakes include only the one or more rear brakes. In some embodiments, the one or more front brakes include two front brakes, one positioned to facilitate braking each of the front tractive elements 78. In some embodiments, the one or more front brakes include at least one front brake positioned to facilitate braking the front axle 76. In some embodiments, the one or more rear brakes include two rear brakes, one positioned to facilitate braking each of the rear tractive elements 88. In some embodiments, the one or more rear brakes include at least one rear brake positioned to facilitate braking the rear axle 86. Accordingly, the braking system 92 may include one or more brakes to facilitate braking the front axle 76, the front tractive elements 78, the rear axle 86, and/or the rear tractive elements 88. In some embodiments, the one or more brakes additionally include one or more trailer brakes of a trailed implement attached to the vehicle 10. The trailer brakes are positioned to facilitate selectively braking one or more axles and/or one more tractive elements (e.g., wheels, etc.) of the trailed implement.

Exemplary Cab Step Environment

Figure 4A:
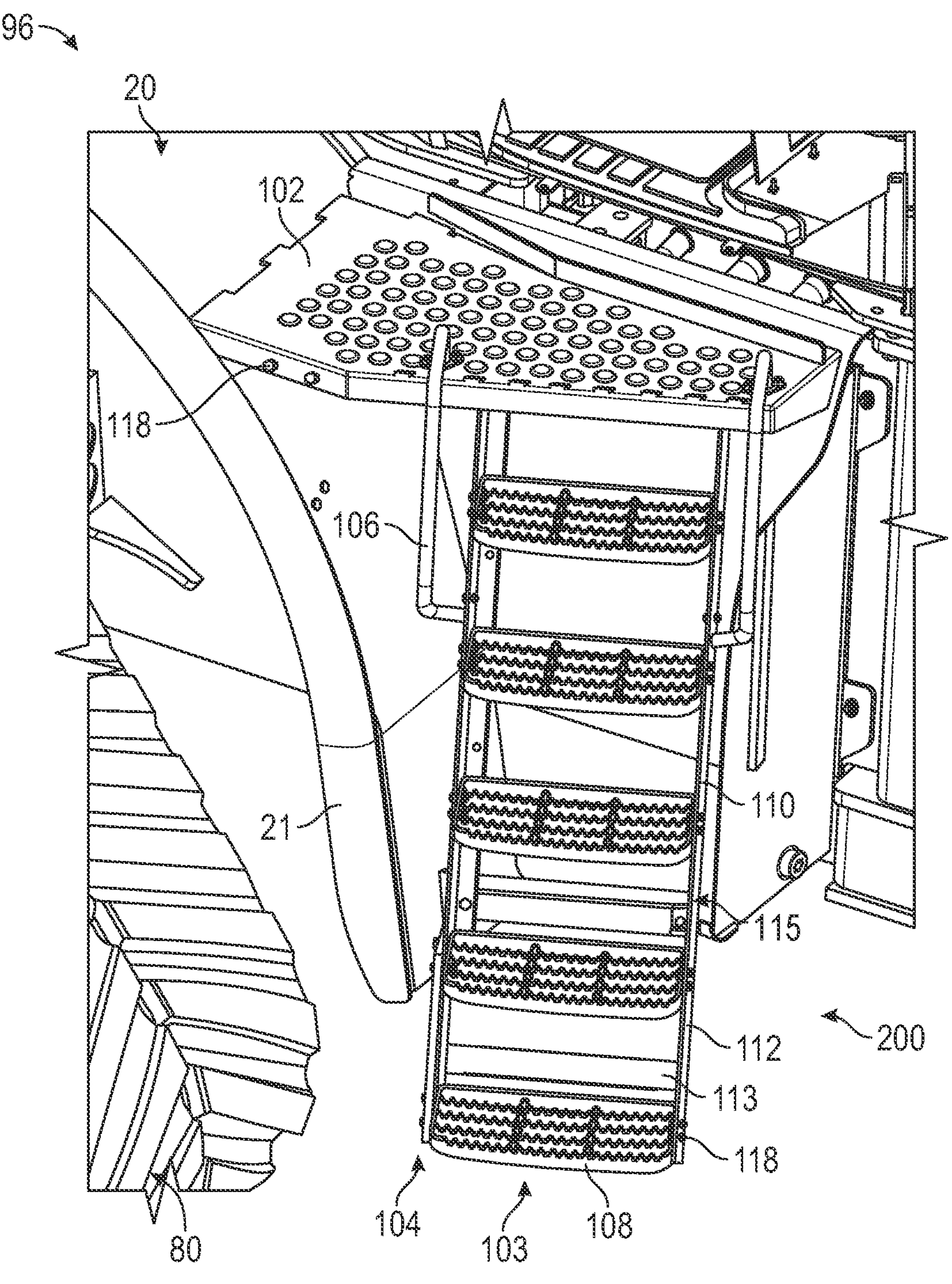
FIGS. 4A-C show an exemplary cab step environment equipped with a fixed or mechanical swing step system.
Figure 4C:
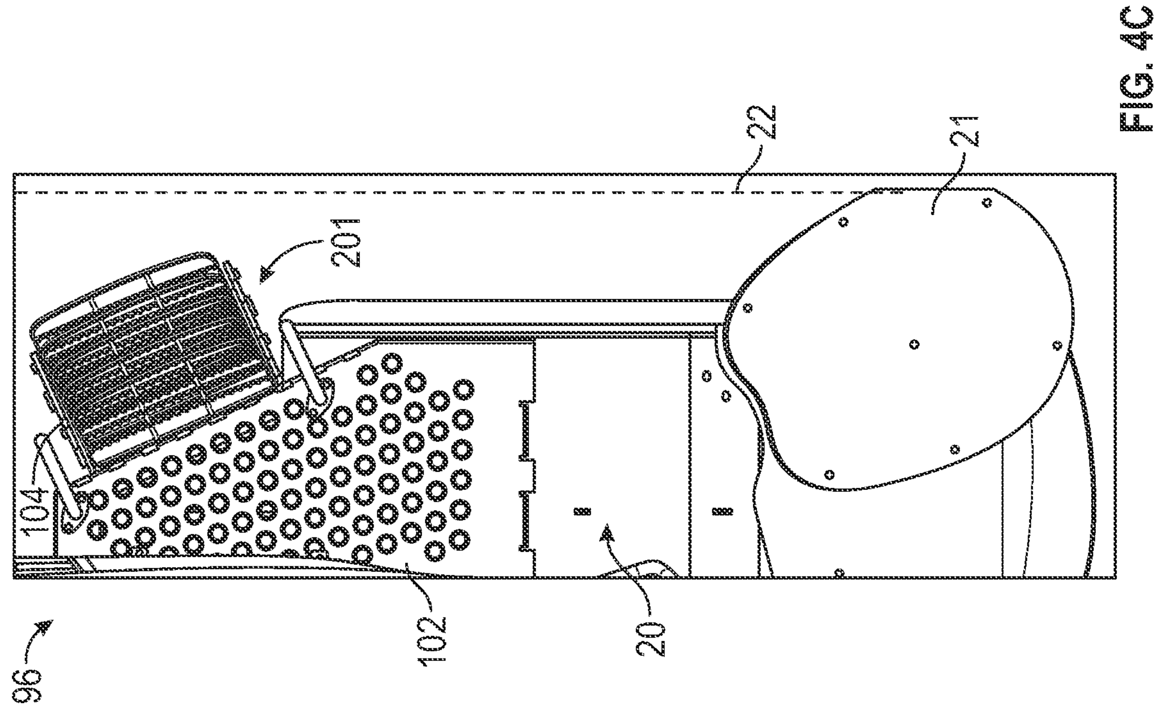
Figure 4B:
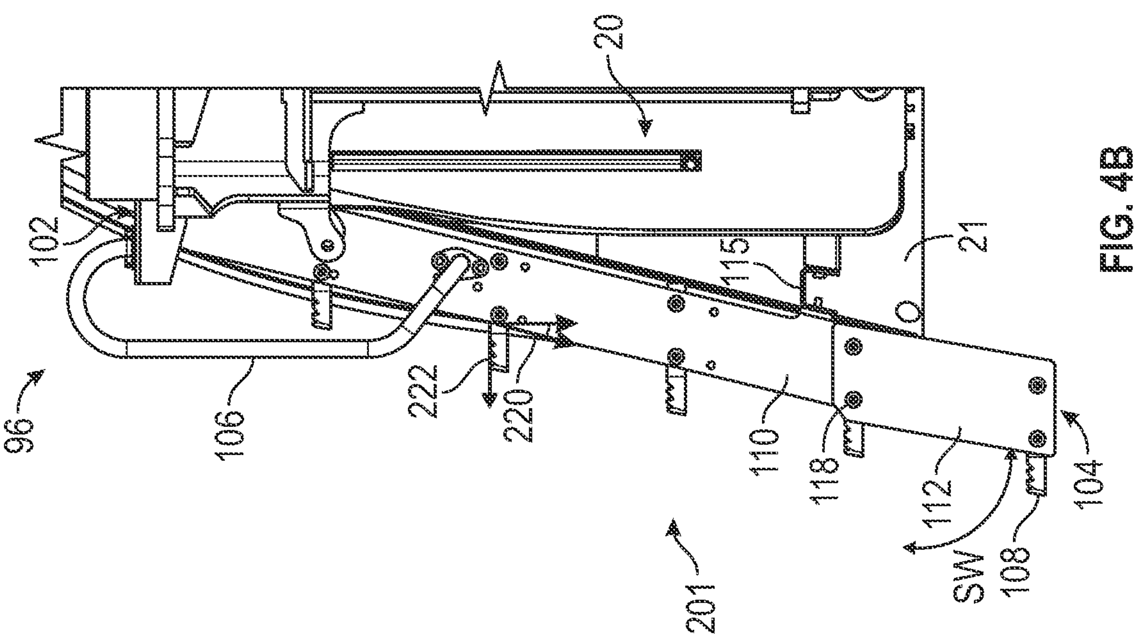

Turning to FIGS. 4*a-c*, an example cab entry environment 96 is shown from a side view relative to the vehicle 10 (FIG. 4*a*), a front view relative to the vehicle 10 (FIG. 4*b*), and from an overhead view (FIG. 4*c*). The exemplary cab entry environment 96 includes multiple components that may also be included in the cab step systems, control systems, and methods disclosed herein, as discussed below. However, the cab entry environment 96 shown in FIGS. 4*a-b* is equipped with a fixed step system 201 that includes limited functionality as compared to the cab step systems (e.g., cab step system 400, non-limiting embodiments of which are shown in FIGS. 6-9) of the present disclosure.

The body 20 of the vehicle 10 may provide a designated location for the cab entry environment 96. For example, the cab entry environment 96 may generally be located between the front tractive assembly 70 and the rear tractive assembly 80 and adjacent to a cab 30 of the vehicle 10. The cab entry environment 96 may contribute to a maximum width of the body 20 of the vehicle 10. For example, the body 20 may have a homologation width requirement (e.g., such as a maximum width of 3 meters, a minimum width at various locations of the vehicle 10, etc.). Accordingly, the inclination angle and horizontal run of the cab entry environment 96 and/or a staircase thereof may be limited by regulations, technical requirements, and other standards. As used herein, an inclination angle may refer to the angle from a vertical plane defining the steepness or incline of a staircase, from a first step to a second step, from the ground to a top platform, etc. Also as used herein, a horizontal run may include a horizontal distance that a staircase extends from a top platform to a bottom step, from one step to another step, etc. Accordingly, the angle of inclination, the horizontal run, and other characteristics of the cab entry environment 96 may be limited and/or influenced in order to avoid increasing the width of the vehicle 10. Some vehicles 10 may have a maximum width that is defined by a fender 21 or by the tractive elements. For example, the fender 21 may include a portion of the body 20 that covers or extends horizontally outward from the tractive elements. In some embodiments, the fender 21 may include side paneling, protrusions, or other features of the body 20.

The cab entry environment 96 may include a platform 102 proximate and/or adjacent to the cab 30. The platform 102 may be an upper platform or a top platform of the cab entry environment 96 that is configured to allow the operator to transition from the exterior to the interior of the vehicle 10. Further, the platform 102 may provide an upper surface for the operator to stand upon and/or walk upon to inspect or perform tasks on the outside of the vehicle 10. The platform 102 may be coupled to the vehicle 10 and/or the body thereof by one or more fasteners 118 such as bolts, rivets, welds, or other suitable fasteners. In some embodiments, the platform 102 may be integrally formed with the vehicle 10 or the body 20. As used herein, integrally formed may mean formed as a single piece or unit such that the components cannot be separated without breaking one of the components. For example, a platform 102 that is integrally formed with the body 20 may be cast, injection molded, or the like as a single piece with a panel/portion of the body 20, the fender 21, etc. The body 20, fender 21, and platform 102 may be comprised of a suitable material that provides rigidity and strength for the vehicle 10. For example, the body 20, fender 21, and platform 102 may conform to one or more standards (e.g., ISO standards) and may be comprised of metals/alloys such as steel, iron, aluminum or the like, plastic or composite materials, other suitable materials and/or combinations thereof.

As shown in FIGS. 4*a-c*, the platform 102 may include a floor panel with perforations such as holes or slots, a friction surface such as ridges, protrusions, or another suitable surface. The platform 102 may include one or more siding panels, beveled edges, or liners as shown in FIG. 4*a* to improve the form and reduce the number of sharp surfaces or the like of the platform 102.

The cab entry environment 96 may also include an ingress/egress path such as a ramp, steps, and/or staircase 103. As shown for example in FIGS. 4*a-c*, 5*a-c*, and 6-8, the cab entry environment 96 includes a staircase (e.g., staircase 103, a series of steps, etc.). In FIGS. 4*a-c*, the staircase 103 is coupled to the platform 102 and generally extends downward towards the ground from the platform 102. The staircase 103 may also be coupled to the vehicle 10 in other locations such as via the body 20, via a brace, bracket, mount, rest, or other suitable support feature linking the staircase 103 to the vehicle 10.

The staircase 103 may comprise one or more step supports 104, one or more handrails 106, and a plurality of steps 108. The one or more step supports 104 are configured to couple one step 108 to another step 108 and/or the vehicle 10. In this way, the step supports 104 provide a frame and support structure to secure the steps 108 and the staircase 103 to the vehicle 10. For example, in FIG. 4, the step support 104 comprises two frames extending from the platform 102 towards the ground. The steps 108 extend between the two frames and are coupled to the frames at each end by fasteners 118. The frames also include a back rail which the back side of some steps 108 abut. The step support 104 may include one or more support segments. For example, as best shown in FIG. 4*b*, the step support 104 includes a first support segment 110 extending from the platform 102 towards the second to last step 108, and a second support segment 112 coupled to the first support segment 110 via fasteners 118 and extending from the second to last step to the bottom step (e.g., the last step) 108. In some embodiments, the individual support segments may extend between each adjacent step 108. As shown in FIG. 4*a-c*, the staircase 103 and steps thereof are fixed and thus the horizontal angle 222 of the steps 108 and the vertical angle 220 (e.g., the angle of inclination 220) and the steepness of the staircase remains constant. However, in other step systems (e.g., FIG. 5*a-c*), some support segments may be pivotable or may be configured to mechanically swing or fold to partially reduce/extend the space/profile of the staircase 103, 203. However, even in step systems with movable steps, steps and segments are configured to be fixed in place and may not be configured to swing, fold, or otherwise move from their position coupled to the body 20 and/or relative to the vehicle 10. The step support 104 may also include other features such as a horizontal brace 113. The horizontal brace 113 may be a horizontal bar, a cross brace, a truss, or another suitable structure extending between support segments of the step support and/or between the step support 104 and the vehicle 10. As shown in FIG. 4*b*, the step support 104 may also include a mounting bracket 115 fixedly coupling the staircase 103 to the body 20 of the vehicle 10.

The staircase 103 may also include one or more handrails 106. The handrails 106 may be coupled one or more of the platform 102, the vehicle 10, the staircase 103 or other suitable components to provide an operator a steady surface to hold onto as they ascend and/or descend the staircase 103.

Turning to FIG. 4*c*, the fender 21 and/or the body 20 of the vehicle 10 may define a fender width 22 that extends horizontally from the side of the vehicle 10. Advantageously, the components of the vehicle 10 may fit within the fender width 22 to meet width standards and to decrease the likelihood that components of the vehicle 10 extending beyond the fender width 22 strike or collide with other vehicles, objects, individuals, other components of the vehicle 10, or the like. For example, as shown in FIG. 4*c*, the step system 201 has a profile that fits within and does not extend horizontally beyond the fender width 22. However, by reducing the horizontal distance of the step system 201, the steepness of the staircase 103 (e.g., the angle of inclination as measured from a vertical plane) may decrease. For example, the angle of inclination 220 shown in FIG. 4*b* may be approximately 13 degrees, 10 degrees or less, or the like. The relatively steep angle of inclination 220 may increase the difficulty that an operator experience when climbing the staircase 103 and may result in a higher vertical rise between adjacent steps 108. To increase the ease of the operator in traversing the steps 108, the steps 108 advantageously have a horizontal angle 222 that is proximate to or 0 degrees (e.g., the top surface of the step is horizontal and is not slanted). However, the fixed step system 201 suffers from the disadvantage of having a constant (and relatively steep) angle of inclination 220 of approximately 13 degrees or less.

Figure 5A:
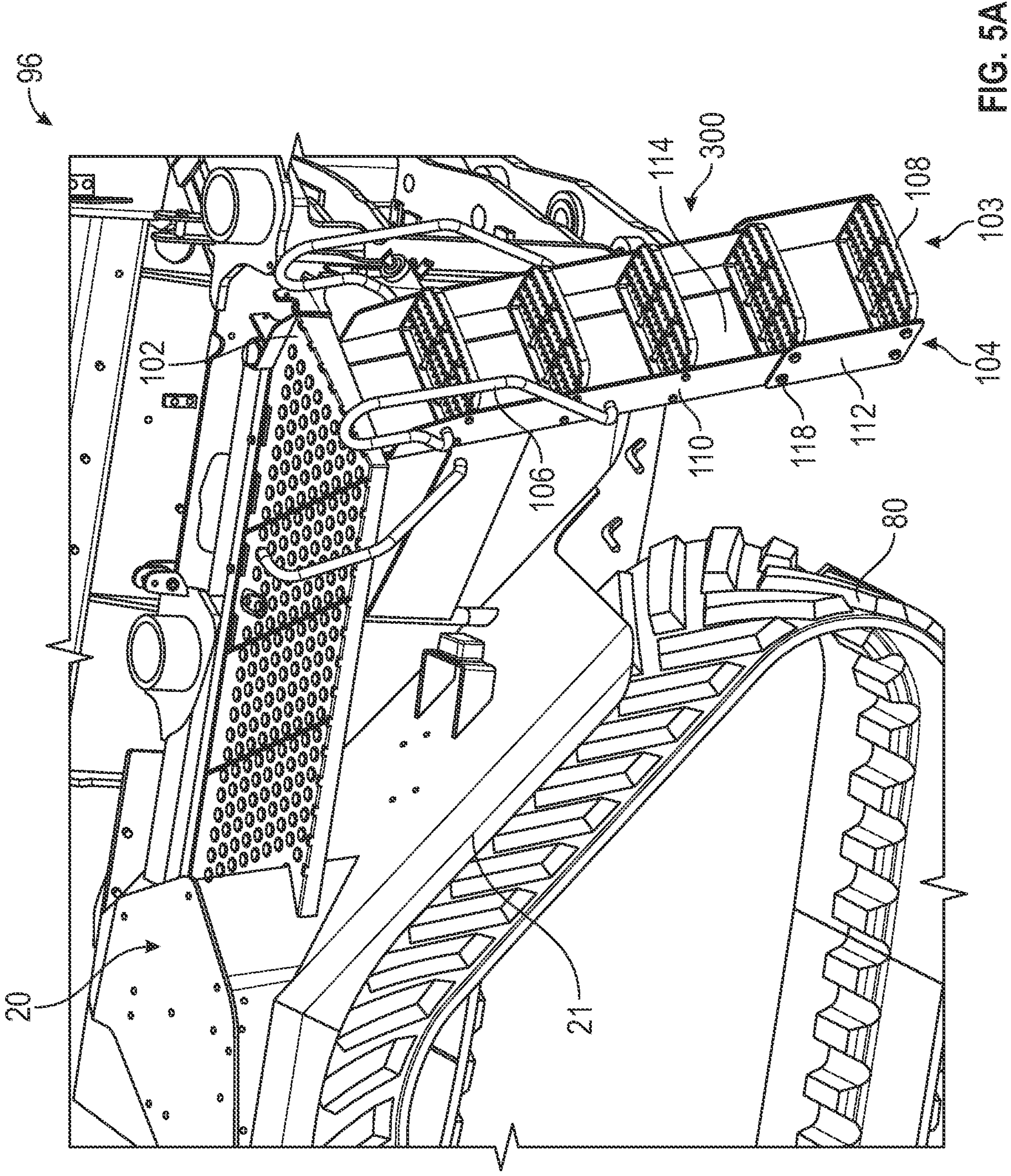
FIGS. 5A-C show an additional exemplary cab step environment equipped with another fixed or mechanical swing step system.
Figure 5C:
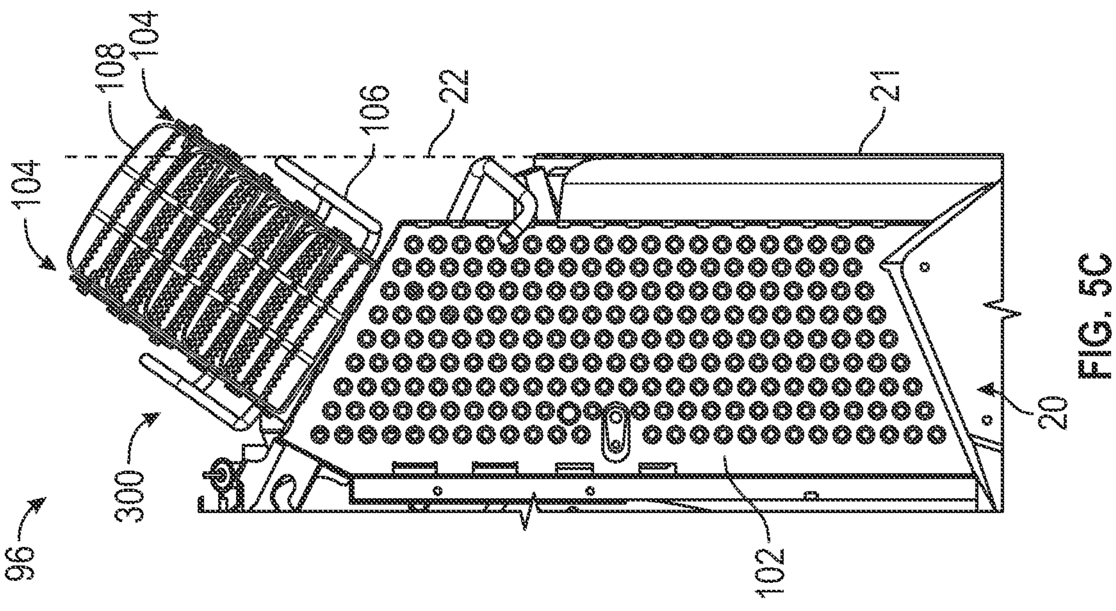
Figure 5B:
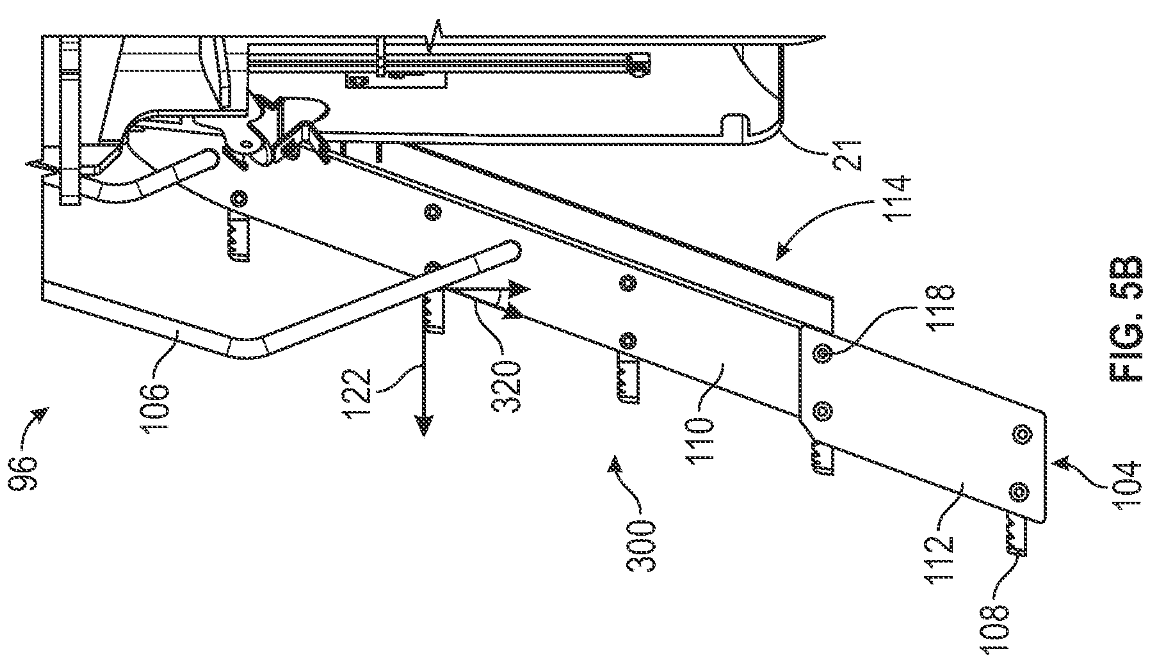

Turning to FIGS. 5*a-c*, another example cab entry environment 96 is shown from a side view relative to the vehicle 10 (FIG. 5*a*), a front view relative to the vehicle 10 (FIG. 5*b*), and from an overhead view (FIG. 5*c*). The second exemplary cab entry environment 96 also includes multiple components that may be included in the cab step systems, control systems, and methods disclosed herein (e.g., steps, a platform, etc.), as discussed below. However, the cab entry environment 96 shown in FIGS. 5*a-b* is equipped with a step system 300 that includes limited functionality as compared to the cab step systems (e.g., the cab step system 400) of the present disclosure.

The cab entry environment 96 of FIGS. 5*a-c* includes a platform 102 proximate and/or adjacent to the cab 30. The platform 102 as shown in FIG. 5*a* may include an extended upper surface on which an operator may stand, walk, or move from the staircase 103 to the cab 30. The platform 102 may include one or more segments, surfaces, panels, may be a stepped or tiered platform, may include a ramp or incline, or the like. The platform 102 is similarly integrally formed and/or coupled to the vehicle 10 and/or the body thereof by one or more fasteners 118 such as bolts, rivets, welds, or other suitable fasteners. The platform 102 includes one or more floor panels with perforations such as holes or slots (e.g., to prevent rainwater/debris from accumulating on the platform, to decrease the slickness of the platform 102, etc.), a friction surface such as ridges, protrusions, or another suitable surface. The platform 102 may include one or more siding panels, beveled edges, or liners as shown in FIG. 5*a* to improve the form and reduce the number of sharp surfaces or the like of the platform 102. Further, the platform 102 may be shaped to fit or follow the contour of the vehicle 10. For example, the platform 102 in FIG. 5*a* includes a triangular wedge defined in the upper surface to abut the form of the body 20 above the fender 21.

The cab entry environment 96 may also include an ingress/egress path (e.g., a staircase 103). The staircase 103 is coupled to the platform 102 and generally extends downward towards the ground from the platform 102. The staircase 103 may also be coupled to the vehicle 10 in other locations such as via the body 20, via a brace, bracket, mount, rest, or other suitable support feature linking the staircase 103 to the vehicle 10.

The staircase 103 again may comprise one or more step supports 104, handrails 106, and steps 108. The one or more step supports 104 are configured to couple one step 108 to another step 108 and/or the vehicle 10. For example, in FIG. 5*a*, the step support 104 comprises two frames extending from the platform 102 towards the ground. The steps 108 extend between the two frames and are coupled to the frames at each end by fasteners 118. The step support 104 may also include a backing 114 (e.g., a back panel, a sheet extending behind the steps 108 to prevent an operator's foot from sliding through the gap between two steps 108, etc.) which the back side of some steps 108 abut. The backing 114, as shown in FIGS. 5*a* and 5*b*, may extend from the platform 102 down the back side of the staircase 103 (e.g., towards the ground and/or the bottom step 108). The step support 104 may include one or more support segments. For example, as best shown in FIG. 5*b*, the step support 104 includes a first support segment 110 extending from the platform 102 towards the second to last step 108, and a second support segment 112 coupled to the first support segment 110 via fasteners 118 and extending from the second to last step to the bottom step (e.g., the last step) 108. In some embodiments, the individual support segments may extend between each adjacent step 108. Further, some support segments may be pivotable or may be configured to mechanically swing or fold to partially reduce/extend the space/profile of the staircase 103. For example, the second support segment 112 may be a component of a mechanical swing step. Specifically, the second support segment 112 may be coupled to a mechanical system of the vehicle 10 (e.g., a brake system, a hydraulic line, or the like). When the brake system is released or depressed, when hydraulic fluid is diverted to the swing step, or the like, the second support segment may pivot or fold (e.g., swing in the direction of the line SW, swing upward and/or pivot away from the ground, etc.) while the remainder of the staircase 103 remains fixed in place. In this way, while the vehicle 10 is moving, a portion of the staircase 103 may pivot, move, or fold to decrease the size of its profile. However, swing step systems may fail to lower the step from its altered position in an emergency scenario and inhibit an exit path of an operator, may lack override capabilities, and otherwise lack the functionality of the cab step systems (e.g., the cab step system 400) as disclosed herein.

The other segments and steps 108 may be fixed in place and may not be configured to swing, fold, or otherwise move from their position coupled to the body 20 and/or relative to the vehicle 10. The step support 104 may also include other features such as a fixed mounting bracket 115. The fixed mounting bracket 115 may immovably secure one or more support segments of the step support 104 and/or between the step support 104 and the vehicle 10.

Turning to FIG. 5*c*, the fender 21 and/or the body 20 of the vehicle 10 may similarly define a fender width 22 that extends horizontally from the side of the vehicle 10. Advantageously, the components of the vehicle 10 may fit within the fender width 22 to meet width standards and to decrease the likelihood that components of the vehicle 10 extending beyond the fender width 22 strike or collide with other vehicles, objects, individuals, other components of the vehicle 10, or the like. However, as shown in FIG. 5*c*, the step system 300 has a profile that does not fit within (e.g., extends horizontally beyond) the fender width 22. A mechanical swing step or other feature may allow a portion of the staircase 103 of the step system 300 to fit within the fender width 22 while the vehicle 10 is moving. The increased horizontal distance of the step system 300 may provide for a reduced steepness of the staircase 103. For example, the angle of inclination 220 of the staircase 103 as shown in FIG. 5*b* may be approximately 20 degrees. The angle of inclination 220 is larger than the angle of inclination 120 and thus the step system 300 is less steep (e.g., provides a more gradual incline) than the step system 201. Accordingly, an operator may find the step system 300 easier to climb and have a decreased risk of falling while traversing the step system 300 (e.g., given the 0-degree horizontal angle 222 of the steps 108). However, by increasing the horizontal distance of the step system 300 and reducing the steepness of the staircase 103 (e.g., increasing the angle of inclination as measured from a vertical plane), the step system 300 may increase the risk that component collide with the vehicle 10, other vehicles, or surrounding objects and may prohibit or block a path of the operator while the vehicle 10 is moving. Further, increasing the horizontal distance of the step system 300 may require reducing the size of the top platform 102 in order to allow the step system 300 to comply with width requirements, regulations, or the like. Reducing the size of the top platform 102 is disadvantageous as the operator is provided less room to stand when servicing or performing tasks on the area outside the cab 30.

Exemplary Cab Step System

Figure 7:
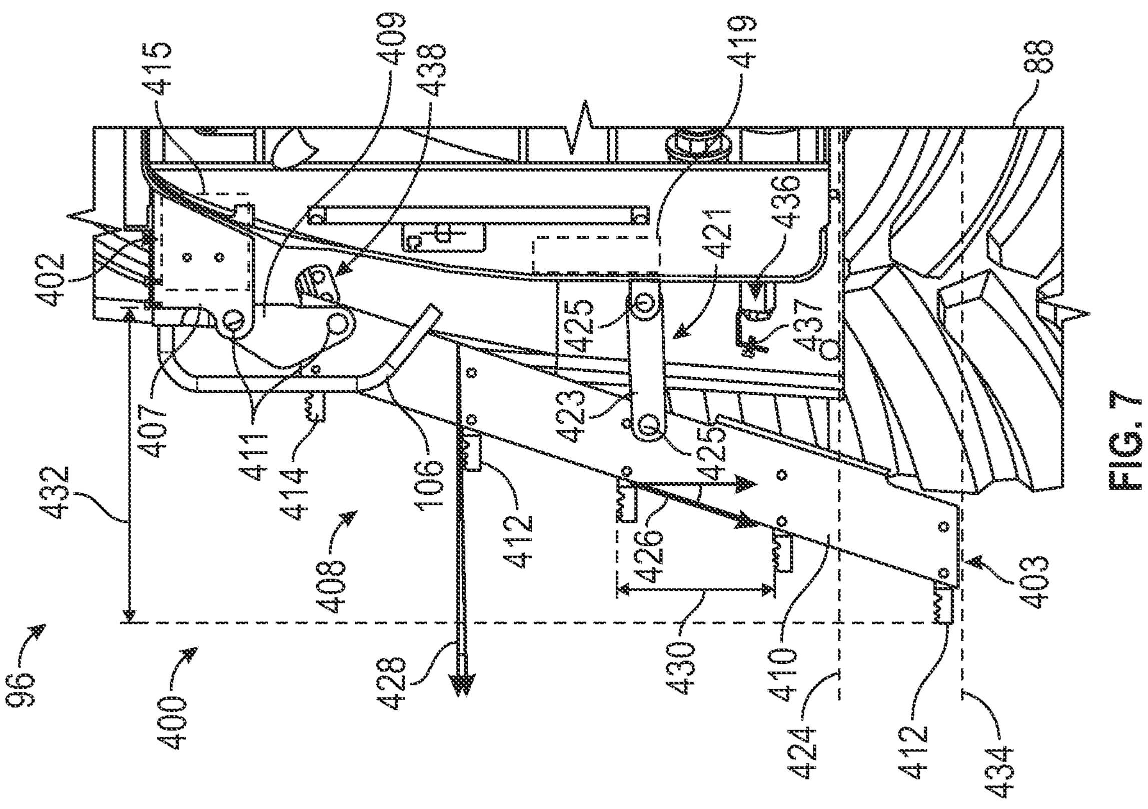
FIG. 7 is the exemplary cab step system of FIG. 6 in an extended state, according to an exemplary embodiment.
Figure 6:
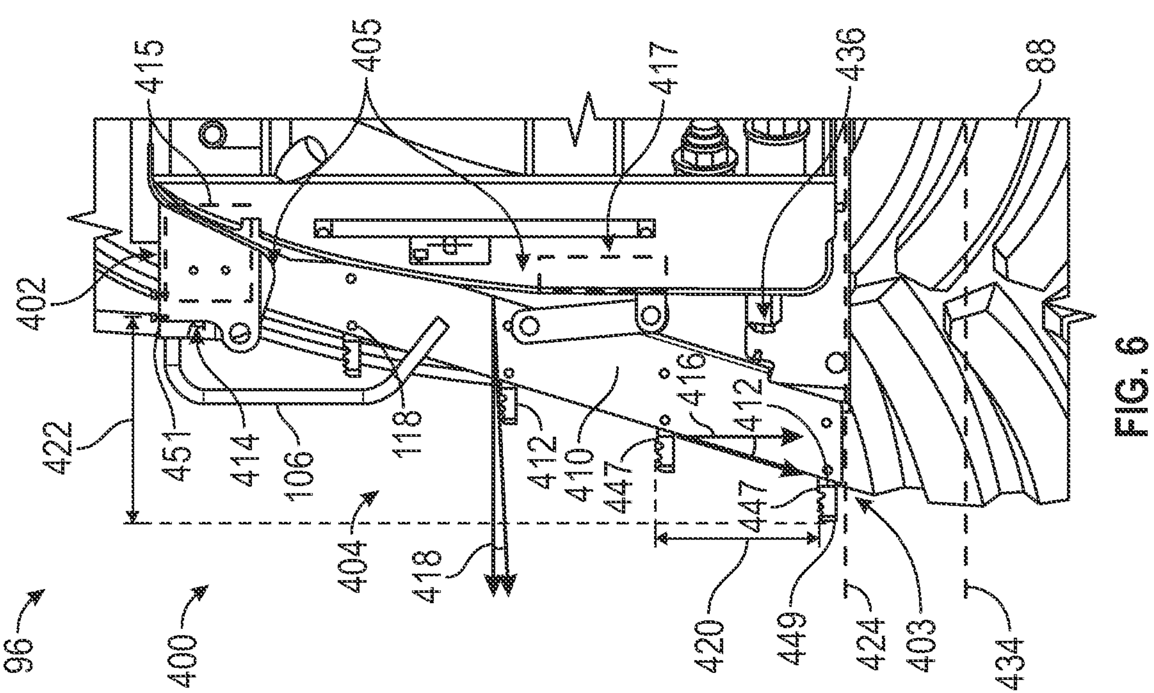
FIG. 6 is an exemplary cab step system shown in a retracted state, according to an exemplary embodiment.

Turning to FIGS. 6 and 7, a side view of a cab step system 400 is shown (e.g., a view from a direction of the front of vehicle 10). Notably, the cab step system 400 includes an ingress and egress path, e.g., staircase 403, having a retracted state 404 (FIG. 6) and an extended state 408 (FIG. 7). The cab step system 400 is configured to selectively transition the staircase 403 from the retracted state 404, through one or more transition state(s) 406 (shown in FIG. 8), to the extended state 408, and vice versa in response to one or more conditions of the vehicle 10 and/or the surroundings thereof. In this way, the cab step system 400 may set the staircase 403 to the extended state 408 when prioritizing the ease of operator ingress/egress (e.g., set the staircase 403 to the extended state 408 when the operator is expected to enter/leave the cab 30). Similarly, the cab step system 400 may set the staircase 403 to the retracted state 404 when prioritizing performance of the vehicle 10, reducing the width of the vehicle 10, etc. (e.g., set the staircase 403 to the retracted state 404 when the vehicle 10 is travelling at speed/operating because the operator is unlikely to exit the vehicle 10 until the vehicle 10 is stopped/parked, the vehicle 10 must meet a homologation requirement, etc.).

The cab step system 400 may include a platform 402, a staircase 403, and a linkage system 405, which may be controlled by one or more controllers (e.g., a controller 200 of the vehicle, a controller 200 of the cab step system 400, a controller 200 which communicates with the vehicle 10, an off-board controller 200, a remote controller/control system 200, etc.). The platform 402 provides space for the operator to access the cab 30. The platform 402 provides a stable and secure area for standing or stepping during ingress and egress. As discussed above, the platform 402 may include an upper surface, floor panels, or the like that are perforated, include holes/slots, include textured/friction surfaces and the like to increase operator comfort, safety, and longevity of the platform 402.

The staircase 403 may comprise at least one support segment 410, a plurality of steps 412 with at least one step 412 being a retractable step 414, and a handrail 106. The staircase 403 may be coupled to the platform 402 and may be configured to move relative to the platform 402. The handrail 106 may have at least one end coupled to the platform 402, the staircase 403, the vehicle 10, etc. In some embodiments, multiple ends or connections points of the handrail 106 are attached to the platform 402 and the vehicle 10. In other embodiments, one end of the handrail 106 may be coupled to the platform 402 and an opposite end of the handrail 106 may extend alongside the staircase 403 (e.g., the handrail 106 may be cantilevered). The handrail 106 may provide sufficient stiffness and may be proximate to the staircase 403 to enable an operator to find a secure grip during ingress and egress of the vehicle 10.

The support segment 410 may include an upper end and a lower end. The steps 412 and the retractable step 414 may be coupled to the support segment 410 between the upper end and the lower end. For example, the staircase 403 may include two support segments 410 parallel and facing each other. The steps 412 and the retractable step 414 may extend between the two support segments 410 and may be coupled to the support segments 410 by one or more fasteners 118 at respective ends of the steps 412 and the retractable step 414. In some embodiments, the steps 412 may be integrally formed with the support segment 410. In some embodiments, only one support segment 410 may be used. For example, the support segment 410 may be disposed behind the steps 412 and the retractable step 414 and be coupled to a center of the back side of the steps 412, the retractable step 414, and the vehicle 10. Other suitable arrangements of the support segment 410 are possible (e.g., having individual support segments 410 linking each step 412 to an adjacent step 412, having one or more support segments 410 linking each step 412 and/or the retractable step 414 to the vehicle 10, etc.).

The lower end of the support segment 410, the bottom of the staircase 403, and/or the lower surface of the bottom-most step 412 (e.g., the lowest point of the staircase 403) may define a clearance height between the staircase 403 and a ground surface (e.g., the ground, a road on which the vehicle 10 is travelling, etc.). As used herein, the clearance height may refer to the vertical distance between the lowest part of a staircase 103, 203, 403 (generally the bottom edge of the lowest step 412 or any part of the staircase 403 structure that extends below the bottom step 412) and the ground or surface below the staircase 403. The staircase 403 may have a variable clearance height that changes as the staircase 403 transitions from the retracted state 404, a transition state 406, and/or the extended state 408. Generally, the clearance height is greatest in the retracted state 404 and the clearance height is the smallest in the extended state 408. For example, the staircase 403 may be closest to the ground while in the extended state 408 and furthest from the ground while in the retracted state 404. An example maximum clearance height 424 is shown best in FIG. 6 and corresponds, for example, to the lower end of the support segment 410 when the staircase 403 is in the retracted state 404. An example minimum clearance height 434 is shown best in FIG. 7 and corresponds, for example, to the lower end of the support segment 410 when the staircase 403 is in the extended state 408. It is advantageous to increase the clearance height during operation of the vehicle 10 (e.g., to prevent the staircase 403 from colliding with the ground) and to decrease the clearance height for an operator's ingress/egress of the vehicle 10 (e.g., to reduce the distance/height the operator must travel to access the staircase 403 from the ground). As shown in FIGS. 6, 7, and 8, the cab step system 400 may selectively transition between the maximum clearance height 424 and the minimum clearance height 434 and advantageously may place the staircase 403 in the appropriate state in response to operation of the vehicle 10, an operator's anticipated ingress/egress, a receipt of information from the controller 200, a sensor, or the like, or in response to other conditions discussed herein (e.g., an articulation of the vehicle 10's tractive element/steering wheel above an articulation threshold).

The staircase 403 also includes an angle of inclination (e.g., an angle from a vertical plane indicating the steepness of the staircase incline) and a horizontal angle (e.g., an angle of the stepping surface of a step 412, 414). The staircase 403 of the cab step system 400 may have a variable angle of inclination and a variable horizontal angle. For example, the angle of inclination and the horizontal angle may change as the staircase 403 transitions from the retracted state 404, to the transition state(s) 406, to the extended state 408, etc. More specifically, the angle of inclination refers to the angle between the entire staircase and a vertical line/plane perpendicular to a horizontal ground plane. The angle of inclination affects the ease of ascent and descent of an operator. A steeper angle (e.g., a smaller angle from the vertical plane or, conversely, a larger angle from a horizontal plane with respect to the ground) can make the staircase 403 more challenging to use and can increase operator discomfort. As used herein, a perfectly vertical staircase would have an angle of inclination of 0 degrees, while a perfectly horizontal staircase would have an angle of inclination of 90 degrees.

Similarly, the horizontal angle (e.g., step angle) refers to the angle of individual steps in relation to a horizontal plane relative to the ground. It is determined by the length (run) and height (rise) of each step 412, 414. For example, a perfectly horizontal step 412 would have a step angle of 0 degrees, while an entirely vertical step 412 would have a step angle of 90 degrees. A perfectly horizontal step 412 generally improves operator comfort and ease of use of the staircase because each step provides an even/flat/level/etc. surface for the operator to stand on. In contrast, steps 412 generally become more difficult to traverse as the horizontal angle increases 90 degrees (e.g., the steps become more and more angled relative to the ground).

As shown in FIGS. 6 and 7, the staircase 403 has a first inclination angle 416 in the retracted state 404 and a second inclination angle 426 in the extended state 408. Advantageously, the first inclination angle 416 in the retracted state 404 may be smaller (e.g., steeper) than the second inclination angle 426 in the extended state 408 (e.g., the staircase 403 have a smaller/gradual incline in the extended state 408 and have a greater incline in the retracted state 404). Similarly, the staircase 403 has a first step angle 418 (e.g., a first horizontal angle) in the retracted state and a second step angle 428 (e.g., a second horizontal angle) in the extended state 408. Also advantageously, the first step angle 418 in the retracted state 404 may be larger than (e.g., steeper) the second step angle 428 in the extended state 408 (e.g., the steps 412 may be tilted further from the horizontal plane in the retracted state 404 and may be flatter/more horizontal in the extended state 408). Accordingly, the staircase 403 may be easier to ascend/descend in the extended state 408 because of the shallower incline and the relatively flat stepping surfaces as compared to the retracted state 404. The staircase 403 may be slightly more difficult to ascend/descend in the retracted state 404 given the steeper incline and the increased slant/tilt of the stepping surfaces and/or steps 412. However, even in the retracted state 404, the operator may still navigate, traverse, or otherwise utilize the staircase 403 (e.g., the staircase 403 is not obstructed, the clearance height is not outside of regulations, or the like).

In some embodiments, the first inclination angle 416 is between 15 degrees and 0 degrees, or between 13 degrees and 7 degrees, and the second inclination angle 426 is between 13 degrees and 25 degrees, or between 15 degrees and 20 degrees. In particular embodiments, the first inclination angle 416 is approximately 13 degrees, and the second inclination angle 426 is approximately 20 degrees. Similarly, in some embodiments, the first step angle 418 is between 3 degrees and 0.5 degrees, or between 1.5 degrees and 1 degree, and the second step angle 428 is between 1.5 degrees and 0 degrees, or between 1.15 degrees and 0.5 degrees. In particular embodiments, the first step angle 418 is approximately 1.15 degrees, and the second step angle 428 is approximately 0 degrees.

The staircase 403 also includes a vertical rise between steps 412, 414 (e.g., a vertical distance between one step to an adjacent step) and a horizontal run of the ingress/egress path (e.g., a total horizontal distance that the staircase 403 extends). The staircase 403 of the cab step system 400 may have a variable vertical rise and a variable horizontal run (e.g., the vertical rise and horizontal run may change as the staircase 403 transitions from the retracted state 404, to the transition state(s) 406, to the extended state 408, etc.).

As shown in FIG. 6, the vertical rise refers to a height of each individual step 412, 414 in the staircase measured from a stepping surface (e.g., a stepping surface 447 shown in FIG. 6) to an adjacent stepping surface 447 of an adjacent step 412, 414. Also shown in FIG. 6, the horizontal run may refer to a horizontal distance the staircase 403 extends from a start 449 of the ingress/egress path (e.g., an edge of a bottom step 412 of the staircase 403) to an end 451 of the ingress/egress path (e.g., an edge of the platform 402 at the top of the staircase 403).

As shown in FIGS. 6 and 7, the staircase 403 has a first rise height 420 between adjacent steps 412, 414 in the retracted state 404 and a second rise height 430 between adjacent steps 412. 414 in the extended state 408. Advantageously, the first rise height 420 in the retracted state 404 may be greater than the second rise height 430 in the extended state 408 (e.g., the vertical distance between adjacent steps 412, 414 may be less extended state 408). In this way, the staircase 403 is less steep and may be easier for an operator to navigate in the extended state 408 and may be more compact and more spatially efficient on the vehicle 10, while still usable by the operator, in the retracted state 404.

Also shown in FIGS. 6 and 7, the staircase 403 has a first run length 422 in the retracted state 404 and a second run length 432 in the extended state 408. Advantageously, the first run length 422 in the retracted state 404 may be smaller than the second run length 432 in the extended state 408 (e.g., the staircase 403 may extend outward/away from the vehicle 10 a larger distance in the extended state 408 than in the retracted state 404). In this way, the staircase 403 may be more comfortable to an operator (e.g., less steep) in the extended state 408 and may have a narrower profile and be less likely to collide with objects around the vehicle 10 or components of the vehicle 10 in the retracted state 404.

The linkage system 405 is configured to transition, set, toggle, or otherwise selectively move the staircase 403 of the cab step system 400 from the retracted state 404 to the extended state 408 and vice versa. As shown for example in FIG. 7, the linkage system 405 may include a frame 407, an extension bracket 409, one or more connections 411, a space 415, and an actuator 417. In some embodiments, the linkage system 405 may include the retractable step 414 and/or other components of the staircase 403, the vehicle 10, etc. Further, the linkage system 405 may include a controller 200 configured to control the cab step system 400 (e.g., to selectively move the staircase 403 from the retracted state 404, to the transition state(s) 406, to the extended state 408, etc.), an override subassembly 440 configured to override the controller 200 and move the staircase 403 towards the retracted state 404 and/or the extended state 408, or other suitable features.

As shown in FIGS. 6 and 7, the frame 407 of the linkage system 405 may include one or more plates, brackets, panels, or other members (e.g., grates, bars, caging, etc.) that may define a housing for the retractable step 414. The frame 407 may couple the extension bracket 409, the retractable step 414, and/or the staircase 403 to the platform 402 or another component of the vehicle 10. In some embodiments, the frame 407 may be proximate to the platform 402 and may be coupled to vehicle 10, the body 20 of the vehicle 10, or another component thereof. In other embodiments, the frame 407 may be integrally formed with the platform 402. As shown in FIGS. 6 and 7, the example frame 407 includes at least one plate (e.g., a metal plate, composite plate, or the like) coupled to the platform 402 via fasteners 118. The example frame 407 may generally extend away from the body 20 of the vehicle 10 and below the platform 402.

The extension bracket 409 may couple the staircase 403 to the frame 407. For example, as shown in FIGS. 6 and 7, the extension bracket 409 couples the staircase 403 to the frame 407 via connections 411. The connections 411 may include pivot connections, swivel connections, connections including intermeshed gears, or other suitable connections. The extension bracket 409 may have a triangular shape as shown in FIG. 7, with connections 411 at opposite vertices of the base of the extension bracket 409. In other embodiments, the extension bracket 409 may have a curved shape, a rounded shape, a spiraling shape, or another suitable shape. In further embodiments, the extension bracket 409 may have one or more segments that collapse/interlock/slidably extend or the like. In other embodiments, the extension bracket 409 may be a component of (e.g., may be integrally formed with) the staircase 403 and/or the platform 402.

The frame 407 and/or the platform 402 may define the space 415 configured to receive one or more components of the linkage system 405 when the staircase 403 is in the retracted state 404. For example, as shown in FIG. 6, when the staircase 403 is in the retracted state 404, the space 415 receives at least a portion of the retractable step 414, the extension bracket 409, and one or more connections 411. Accordingly, when the staircase 403 is in the extended state 408, the retractable step 414 of the staircase 403 may be first step below the platform 402 (See FIG. 7). When the staircase 403 is in the retracted state 404, the retractable step 414 moves, folds, and/or is otherwise received by (e.g., occupies) the space 415 under the platform 402. In this way, the space 415 defined by the frame 407 and/or the platform 402 may act as a housing which receives the retractable step 414 to effectively shorten the length of the staircase 403. As shown in FIG. 6, the second step 412 from the top of the staircase 403 (e.g., the step below the retractable step 414) may be the first step 412 of the ingress/egress path below the platform 402 when the staircase 403 is in the retracted state 404.

In other embodiments, the frame 407 may be coupled to a fixed step 412 or an optional secondary platform below the platform 402. In this way, the retractable step 414 may be received in a space 415 defined beneath a fixed step 412, a second platform, or another surface of the vehicle 10. For example, the cab step system 400 may be one portion of an ingress/egress path that includes an upper fixed ladder/step system positioned above the cab step system 400. In further embodiments, multiple cab step systems 400 may be coupled to the vehicle 10 such that the vehicle 10 includes multiple retracting steps 414, frames 407, actuators 417, etc. that may include various combinations of the embodiments discussed herein.

The actuator 417 is configured to power, cause, and/or mechanically urge the staircase 403 to move from the retracted state 404, to the transition state(s) 406, to the extended state 408, etc. The actuator 417 may include a drive unit 419 and an extendable link 421. For example, as shown in FIG. 7, the extendable link 421 may include an actuator bracket 423 and one or more actuator connections 425 (e.g., actuator pivot connections 425). The extendable link 421 may be configured in various forms and may comprise varied components. For example, the extendable link 421 may include a solid (e.g., inflexible) actuator bracket 423 having a bar shape, a cylindrical shape, a curved/crescent/spiraling shape, or another suitable shape. Similarly, the actuator connections 425 may include pivot connections, swivel connections, ball/socket joints, intermeshed gears, or other suitable connectors. As shown in FIG. 8, the actuator 417 and/or drive unit 419 may include a rod style actuator, linear actuator, hydraulic actuator, pneumatic actuator, a pinion system, a ball screw actuator, or any other suitable actuation system.

As shown in FIGS. 6 and 7, a tractive element of the vehicle 10 (e.g., the rear tractive element 88) may be located proximate to the staircase 403 of the cab step system 400. Further, the vehicle 10 may have a front section and a rear section that shift and/or articulate with respect to one another during a turn of the vehicle 10. Accordingly, during a turning maneuver, components of the vehicle 10 and/or one or more tractive elements of the vehicle 10 may be at risk of colliding with the cab step system 400 if an articulation angle of the tractive elements exceeds an articulation threshold and the cab step system 400 is in the extended state 408, is not in the retracted state 404, etc. For example, the operator interface 40 may have one or more controls that allow an operator to designate an angle of a turn (e.g., a multi-control panel, a control display, a steering wheel, etc.). When the operator interface 40 is set to turn the vehicle in a direction (e.g., left) and the angle of the turn (e.g., the articulation angle) is above an articulation threshold (e.g., 40 degrees, 60 degrees, or the like), the rear portion of the vehicle (e.g., a portion of the frame 12 with the rear tractive assembly 80) may move relative to the front portion of the vehicle 10 (e.g., a portion of the frame with the front tractive assembly 70). To prevent the movement of the rear portion of the vehicle 10 relative to the front portion of the vehicle 10 causing a collision with the cab step system 400, the cab step system 400 may be configured to move to the retracted state 404 in response to an articulation angle exceeding an articulation threshold. When the operator interface 40 is set to direct the vehicle 10 back towards the opposite direction (e.g., more to the right) and/or the articulation angle of the vehicle 10 falls below the articulation threshold, the cab step system 400 may be configured to move to the extended state 408 if the vehicle 10 is at rest, is in park, is not operation, etc. In this way, when the vehicle 10 is in gear, out of park, in motion and/or steering to the left at an angle above the articulation threshold, the staircase 403 may move towards the retracted state 404 (e.g., increase the inclination angle, decrease horizontal run, increase clearance height) to meet overall vehicle width requirements and avoid interference with other components on the vehicle 10.

Turning to FIG. 8, an example embodiment of the cab step system 400 is shown in various states as the staircase 403 transitions from the extended state 408 (e.g., at position (a)), to one or more transition states 406 (e.g., at positions (b) and (c)), to the retracted state 404 (e.g., at position (d)), and vice versa. FIG. 8 also illustrates the relationship of the staircase 403 to an example ground level plane 427 (e.g., ground 427) and the differing clearance heights 434, 443, 445, 424 between the bottom of the staircase 403 and the ground 427 as the staircase 403 moves to and from the extended state 408 and the retracted state 404. In the embodiment of FIG. 8, the cab step system 400 includes two panels of the frame 407, two extension brackets 409, and an actuator 417 comprising a linear drive unit 419 configured to extend/retract an extension rod as of the extendable link 421. The extension rod is coupled to an actuator bracket 423 between a first pivot connection 425 coupling the actuator bracket 423 to the staircase 403 and a second pivot connection 425 coupling the actuator bracket 423 to the body 20. In some embodiments, the panel of the body 20 may be replaced by a secondary frame 407 of the cab step system 400 coupled to the vehicle 10. As the extension rod expands/contracts, the staircase 403 is urged to and from the retracted state 404 and the extended state 408.

Figures 8A, 8B, 8C, 8D:
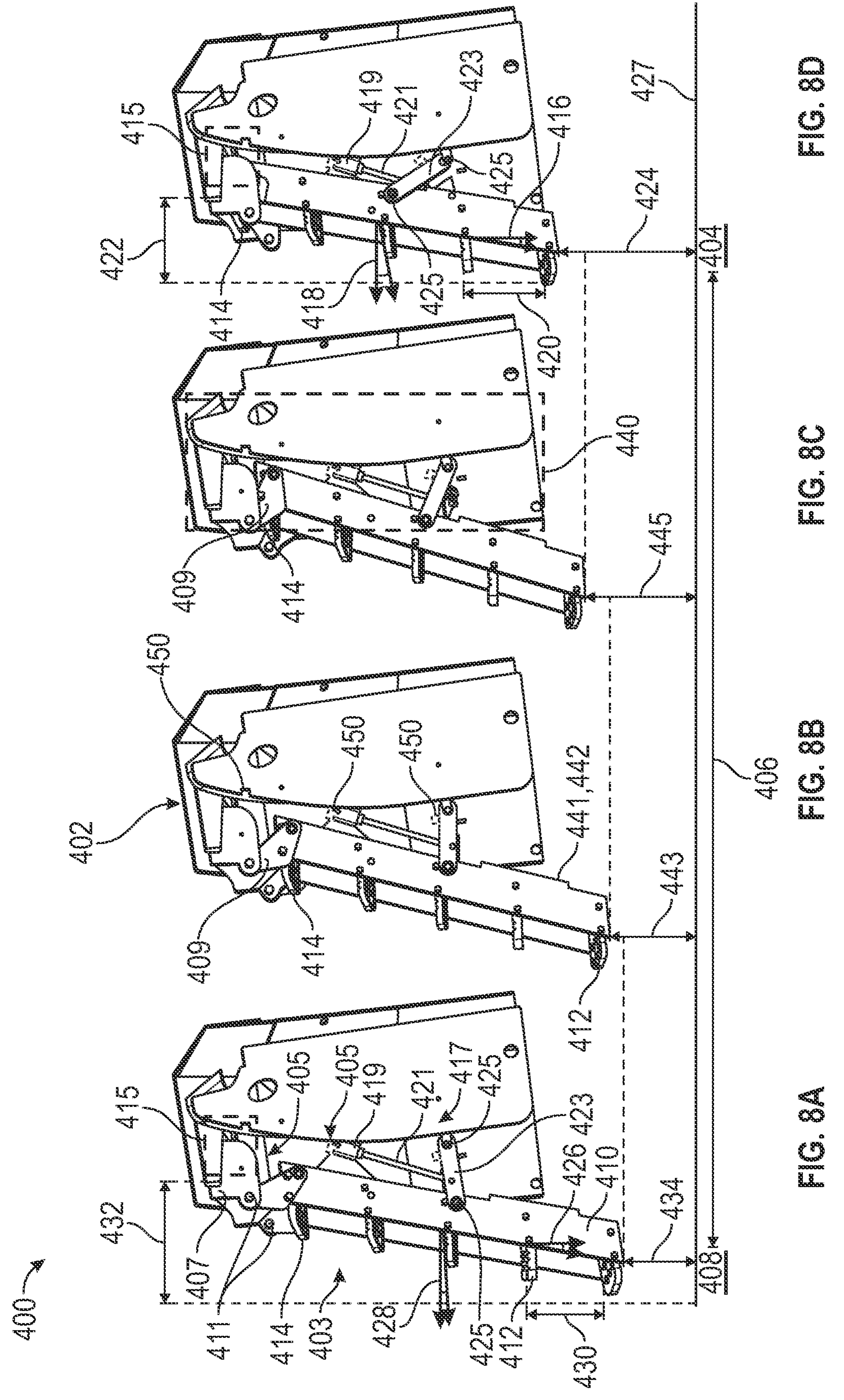
FIGS. 8A-D show an exemplary cab step system in various states including an extended state, a first transition state, a second transition state, and a retracted state, according to an exemplary embodiment.

FIG. 8 illustrates an example embodiment showing how the linkage system 405 provides motion to the staircase 403 (e.g., how the components of the linkage system 405, the staircase 403, the vehicle 10, move relative to one another as the staircase 403 extends and retracts). For example, viewing FIGS. 8*a* to 8*d* in order from left to right (e.g., starting at FIG. 8*a*, moving to FIG. 8*b*, then to FIG. 8*c*, and ending at FIG. 8*d*) provides one example illustration of the linkage system 405 causing movement of the staircase 403 via the actuator 417 to retract the staircase 403. When the staircase 403 retracts, the actuator 417 may cause the extendable link 421 to shorten, which may cause the actuator bracket 423 to rotate about one or more of the actuator pivot connections 425 in a clockwise direction as the staircase 403 moves from the extended state 408 to the retracted state 404. This movement may, in turn, cause the extension bracket 409 to rotate in a counterclockwise direction about one or more of the connections 411 to the frame 407, platform 402, and/or vehicle 10. As shown in FIGS. 8*a-d*, when the staircase 403 retracts, the extendable link 421 of the actuator 417 decreases in length as the figures proceed from left to right, the actuator bracket 423 of the bottom linkage rotates clockwise, and the extension bracket 409 of the top linkage rotates counterclockwise (e.g., when viewed from the rear of the vehicle 10).

Similarly, viewing FIGS. 8*a* to 8*d* in order from right to left (e.g., starting at FIG. 8*d*, moving to FIG. 8*c*, then to FIG. 8*b*, and ending at FIG. 8*a*) provides one example illustration of the linkage system 405 causing movement of the staircase 403 via the actuator 417 to extend the staircase 403. When the staircase 403 extends, the actuator 417 may cause the extendable link 421 to extend/increase in length, which may cause the actuator bracket 423 to rotate about one or more of the actuator pivot connections 425 in a counterclockwise direction as the staircase 403 moves from the retracted state 404 to the extended state 408. This movement may, in turn, cause the extension bracket 409 to rotate in a clockwise direction about one or more of the connections 411 to the frame 407, platform 402, and/or vehicle 10. As shown in FIGS. 8*a-d*, when the staircase 403 extends, the extendable link 421 of the actuator 417 increases in length as the figures proceed from right to left, the actuator bracket 423 of the bottom linkage rotates counterclockwise, and the extension bracket 409 of the top linkage rotates clockwise (e.g., when viewed from the rear of the vehicle 10).

The cab step system 400 may comprise one or more sensors 450. The sensor(s) 450 may be configured to detect a position of the staircase 403 of the cab step system 400, to confirm that the cab step system 400 has reached the extended state 408 and/or the retracted state 404, to detect a load/force limit on the cab step system 400, to detect a fault (e.g., an incomplete transition between the retracted state 404 and the extended state 408), or the like. In this way, the sensors 450 may be configured to detect an error, malfunction, or limited operation of the cab step system 400 (e.g., to prompt/trigger an activation of the override subassembly 440). The sensors 450 may comprise one or more various sensor devices and may be located at various positions on the vehicle 10 and/or the cab step system 400. For example, the sensors 450 may include a limit switch (e.g., a whisker, roller, lever, plunger, or combination thereof limit switch configured to send a signal in response to a mechanical input of the limit switch). Other sensors 450 may include proximity switches, proximity sensors, inclination sensors (e.g., an inclinometer), force sensors, load cells, and other suitable sensors. As shown in FIG. 8, various non-exhaustive sensor 450 locations are shown by solid or dashed boxes 450. For example, a sensor 450 such as a load cell may be located on the actuator 417, an inclinometer may be located on the actuator bracket 423, a proximity sensor/switch and/or a limit switch may be located proximate to the platform 402 and/or the frame 407, a proximity switch/limit switch, or the like may be disposed within a track of a guide slot or guide rail of the cab step system 400, or any suitable variation or combination thereof.

In the extended state 408 as shown in position (a), the retractable step 414 may be located outside of the space 415, the actuator 417 may be fully extended, the clearance height may be set to a minimum clearance height 434, the angle of inclination may be set to a least steep angle of inclination (e.g., the second inclination angle 426), the horizontal angle may be set to a minimum horizontal angle (e.g., the second horizontal angle 428 which may be 0 degrees), the vertical rise between adjacent steps 412, 414 may be set to a minimum rise height (e.g., the second rise height 430), and the horizontal run may be set to a maximum run distance (e.g., the second run length 432). Conversely, in the retracted state 404 as shown in position (d), the retractable step 414 or a portion thereof may be received in the space 415, the actuator 417 may be fully retracted, the clearance height may be set to a maximum clearance height 424, the angle of inclination may be set to a steepest angle of inclination (e.g., the first inclination angle 416), the horizontal angle may be set to a maximum horizontal angle (e.g., the first horizontal angle 418 which may be approximately 1.15 degrees), the vertical rise between adjacent steps 412, 414 may be set to a maximum rise height (e.g., the first rise height 420), and the horizontal run may be set to a minimum run distance (e.g., the first run length 422). As the cab step system 400 moves through or is set to the transition state(s) 406, the cab step system may have characteristics between those described above. For example, the cab step system 400 may be set to a first intermediate clearance height 443 and a second intermediate clearance height 445, both of which are between the minimum clearance height 434 and the maximum clearance height 424.

In some embodiments, the cab step system 400 may be configured to move to and remain in a transition state 406. For example, the cab step system 400 may receive an input (e.g., via the operator interface 40) including information indicative of a position of the staircase 403 (extend-to-half, extend ¾, retract to 20 degrees, retract to X length, set clearance height to Y inches, etc.). In response to receiving the signal indicative of a target transition state 406, the controller 200 may cause the cab step system 400 to move the staircase 403 towards the target transition state 406 (e.g., position (b), position (c), etc.). In other embodiments, the cab step system 400 and/or the controller 200 thereof may be configured to set the cab step system 400 to one or more target transition state(s) 406 in response to the cab step system 400 being unable to move to the retracted state 404, being unable to move to the extended state 408, colliding with an object, reaching a threshold distance from the ground/an object, or the like. For example, a sensor (e.g., a proximity sensor 450) may be coupled to a bottom of the staircase 403. The proximity sensor 450 may detect a distance between the staircase 403 and the ground 427 and/or a surface below the vehicle 10 (e.g., a road, an item on the ground such as a rock, a tire, an obstacle, a curb, etc.). A portion of the ground 427 and/or an obstacle that may be located beneath the staircase 403 (e.g., may be extending from an otherwise flat ground). Accordingly, if the staircase 403 moves to the extended state 408, the staircase 403 may collide with the object/obstruction. The controller 200 may receive a signal (e.g., from the proximity sensor 450) indicating that a distance between the bottom of the staircase and an object is less than a threshold distance. For example, the threshold distance may be a distance smaller than the minimum clearance height 434, may be the minimum clearance height 434, etc. The controller 200 and/or the cab step system 400 may be configured to stop/set the staircase to a designated/determined transition state 406 upon receiving the signal indicating that the distance between the bottom of the staircase 403 and the surface below the staircase is less than the minimum clearance height 434. In this way and for example, the cab step system 400 and/or the controller 200 may be configured to maintain a transition state 406 to avoid colliding with an object.

The cab step system 400 may further include one or more of a rest 436 having a rest interface 437, a guide track 438, a brace 441, and/or a backing 442. The rest 436 is best shown in FIGS. 6 and 7. For example, the rest 436 may be coupled to the body 20 and may be configured to receive/abut a portion of the staircase 403 while the staircase 403 is in the retracted state 404. As shown in FIG. 7, the rest 436 includes a rest interface 437 facing the staircase 403 that may include a latch, bolt, slot, or other component configured to contact a backing, step, or component of the staircase 403. As shown in FIG. 6, when the staircase 403 is in the retracted state 404, the staircase 403 may be supported by the contact with the rest 436 (e.g., at a lower portion of the staircase 403). The cab step system 400 may further include one or more guide tracks 438. As best shown in FIG. 7, the guide track 438 may include a slot, rail, groove, or the like coupled to the frame 407 and/or the body 20 of the vehicle 10. As the cab step system 400 moves between states, a pin, protrusion, or similar member received within the guide track 438 may direct the extension/retraction of the staircase 403. As best shown in FIG. **8*b*, the cab step system 400 may further include one or more braces 441 and/or backings 442 that add further structural support to the staircase 403, prevent an operator's foot from sliding between the steps 412, etc. The various features described above may be combined or included in any combination (e.g., a rest 436 may be integral with or configured to abut a backing 442 of the staircase 403**).

The cab step system 400 may further include an override subassembly 440 (e.g., as schematically represented by box 440 in FIGS. 8-10) The override subassembly 440 is configured to set, move, mechanically urge, etc. the cab step system 400 towards the retracted state 404 and/or the extended state 408. In this way, the override subassembly 440 is configured to selectively move the cab step system 400 between the retracted state 404 and the extended state 408 or the like regardless of the signal/commands/etc. of the controller 200 (e.g., in the event a fault, error, or the like is detected by the controller 200, the operator, and/or the cab step system 400). The override subassembly 440 may be partially or entirely mechanical. For example, in some embodiments, the operator may activate/engage the override subassembly 440 via one or more switches, levers, inputs of the operator interface 40 to forcibly move the staircase 403 to the extended state 408 and/or the retracted state 404. In this way, the override subassembly 440 may provide an override (e.g., a mechanical override, an electronic override, etc.) configured to extend the staircase 403 of the cab step system 400 the staircase 403 of the cab step system 400 even if the controller 200 is set to the retracted state 404 and retract the staircase 403 of the cab step system 400 even if the controller 200 is set to the extended state 408. Accordingly, the override subassembly 440 provides an alternative manner of moving the staircase 403 in the event one or more sensor 450 malfunctions, in an emergency scenario, or the like.

Figure 9:
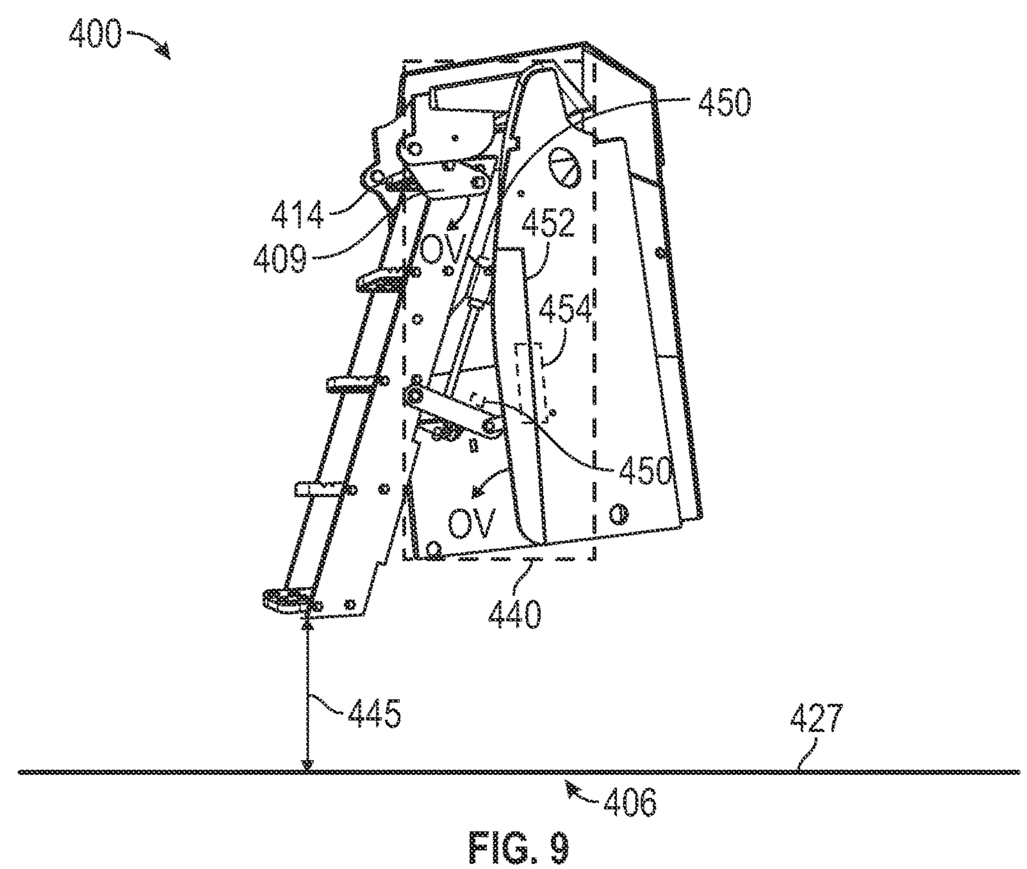
FIG. 9 shows an exemplary cab step system in a transition state of FIG. 8 and including an example override subassembly.

Turning to FIG. 9, a non-limiting example embodiment of an override subassembly 440 and components thereof are shown while the step is in position (c) of FIG. 8 (e.g., at the second intermediate transition height 445). The override subassembly 440 may comprise one or more detachable/articulable interfaces 452 and one or more decouplable/articulable connectors 454. The override subassembly 440 may be powered/actuated by hydraulic lines, pneumatic lines, magnetic connectors, or other suitable mechanisms.

For example, in one embodiment, the override subassembly 440 may be configured to forcibly move the staircase 403 to the extended state. As shown in FIG. 9, the interface 452 may include a detachable interface 452 held to the frame by the decouplable connector 454. In specific embodiments, the detachable interface may include a portion of the frame 407 or body 20 fixed to the vehicle and a separate portion of the body 20 or frame 407 fixed to the actuator 417. The decouplable connector may include a selectively releasable latch 454. In such an embodiment, if the actuator 417 is stuck, jammed, or otherwise does not extend beyond the position shown in FIG. 9, the operator interface 40 may include a control to decouple the decouplable connector 454 (e.g., latch). Decoupling the connector 454 may cause the detachable interface 452 to separate (e.g., move in the direction of the arrow OV) as the actuator 417 is separated from the body 20 of the vehicle 10. Similarly, the staircase 403 may only be connected to the vehicle 10 by the extendable link 409, a guide track 438 or the like, and gravity may cause the staircase 403 and/or the extendable link 409 to move in the direction of the upper arrow OV (e.g., towards the extended state 408.

In another embodiment, the override subassembly 440 may be configured to forcibly move the staircase 403 to the retracted state 404. For example, the interface 452 may include a foldable interface 452 and the articulable connector 454 may be a hydraulicly driver flap, lever, etc. In such an embodiment, if the actuator 417 is stuck, jammed, or otherwise does not extend beyond the position shown in FIG. 9, the operator interface 40 may include a control to decouple the articulate the connector 454 (e.g., flap, lever) such that the interface fold/moves towards the vehicle 10. The connector 454 may cause the articulable interface 452 to fold/rotate into the page as shown in FIG. 9 (e.g., move in the direction opposite of the arrow OV). Similarly, the staircase 403 and the extendable link 409 may be urged to move in the direction opposite of the upper arrow OV (e.g., towards the retracted state 404).

Figure 10:
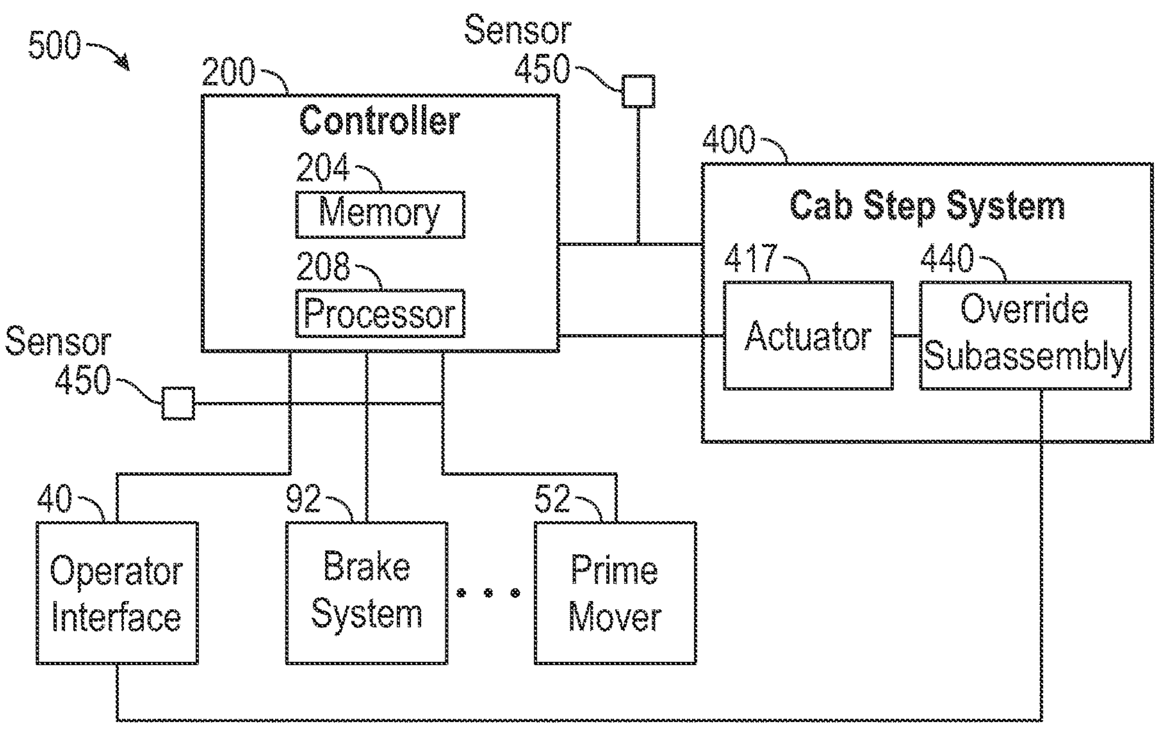
FIG. 10 is a block diagram showing an example control system for a cab step system, according to an exemplary embodiment.

Exemplary Cab Step Control System, Control Logic, and Methods for Controlling a Cab Step System Focusing now on FIG. 10, a block diagram is illustrated showing an exemplary control system 500 for the cab step system 400. The vehicle 10 may include the controller 200 configured to facilitate movement of the cab step system 400. The controller 200 includes a memory device, shown as memory 204 and processing circuitry (e.g., a processor 208). The processor 208 may be configured to execute one or more instructions stored on the memory 204 to perform one or more of the processes described herein. The controller 200 may be configured to receive information from one or more devices (e.g., the operator interface 40, the actuator 417, one or more sensors 450, etc.) and/or to provide information (e.g., notifications, commands, alerts, etc.) to one or more devices (e.g., the prime mover 52, actuator 417, operator interface 40, etc.).

The controller 200 is communicatively coupled to the cab step system 400. The controller 200 may provide commands to the components of the cab step system 400 (e.g., move the staircase 403 to the retracted state 404, move the staircase 403 towards the extended state 408, etc.). By way of example, the controller 200 may control the extension speed, power output of the actuator 417, clearance height/inclination angle/horizontal angle/rise/run/etc. at which to stop/pause movement of the staircase 403. The controller 200 may also be communicatively coupled to the operator interface 40, one or more systems of the vehicle 10 (e.g., the brake system 92, the prime mover 52, etc.) and/or one or more of the sensors 450. The controller 200 may receive data indicative a power output of the prime mover 52, a speed of the vehicle 10, a position of the brake of the vehicle 10, a gear (forward, reverse, neutral, park) of the vehicle 10, or the like from the vehicle systems and/or sensors 450 thereon. Similarly, the controller 200 receives data indicative of one or more conditions of the cab step system 400 and/or the vehicle 10 from the sensors 450. For example, the controller 200 may receive an articulation angle from the operator interface 40 and/or a sensor mounted to the tractive assembly 70, 80. The controller 200 may also receive data indicative of the position of the staircase 403 from one or more of the proximity sensors, load cells, inclinometers, limit switches, proximity switches, or the like configured to determine the position, speed, angle, etc. of the staircase 403.

By way of example, the controller 200 may include a communication interface to facilitate communication with the other devices. In some embodiments, the devices of the controller 200 utilize wired communication (e.g., Ethernet, USB, serial, etc.). In some embodiments, the devices of the controller 200 utilize wireless communication (e.g., Bluetooth, Wi-Fi, Zigbee, cellular communication, satellite communication, etc.). The devices of the controller 200 may communicate over a network (e.g., a local area network, a wide area network, the Internet, a CAN bus, etc.).

In other embodiments, the vehicle 10 may include various operator interfaces 40 communicatively coupled to the controller 200. The operator interface 40 may be integral to the vehicle as shown in FIG. 2 (e.g., located inside the cab 30, coupled to the vehicle 10, etc.). Alternatively, the operator interfaces 40 may be portable and/or separable from the vehicle 10. For example, other operator interfaces 40 may include one or more user devices, such as smartphones, tables, laptops, desktops, pagers, or other user devices. By way of example, the operator interface 40 may include touch screens, buttons, steering wheels, pedals, levers, switches, knobs, keyboards, mice, microphones, multi-panel controllers, forward-neutral-reverse-park (FNRP) shuttle levers, and/or other input devices. The operator interface 40 may include one or more output devices configured to provide information to an operator (e.g., notifications, operating conditions, alerts, visual representations of the staircase 403 and the position thereof, etc.). By way of example, the operator interface 40 may include screens, lights, speakers, haptic feedback devices, and/or other output devices.

The operator interface 40 may include one or more input devices configured to receive inputs (e.g., commands, desired states to set the staircase 403, torque/force tolerances above which to stop movement of the staircase 403, desired transition states/angles of inclination, etc. to position the staircase 403 and the like) from an operator to facilitate operator control over the vehicle 10 and the cab step system 400.

The controller 200 may be in feedback communication with the cab step system 400 and continuously operate the cab step system 400. For example, an operator may begin a crop collecting operation, set the vehicle 10 to park and intend to exit the vehicle 10, enter the vehicle 10 and resume the crop collecting operation, and the like. In this way, the controller 200 may constantly communicate with cab step system 400/vehicle 10 to identify the position of the staircase 403, the articulation angle of the vehicle 10, the operating state of the vehicle 10 to continuously toggle the staircase 403 to and from the retracted state 404 and the extended state 408 as needed.

While the components, configuration, and flow directions/pathways of the exemplary cab step control system 500 are shown in FIG. 10, it is understood that variations, substitutions, and additional configurations of the components and exemplary cab step control system 500 are interoperable with the systems and methods for disclosed herein.

Figure 11:
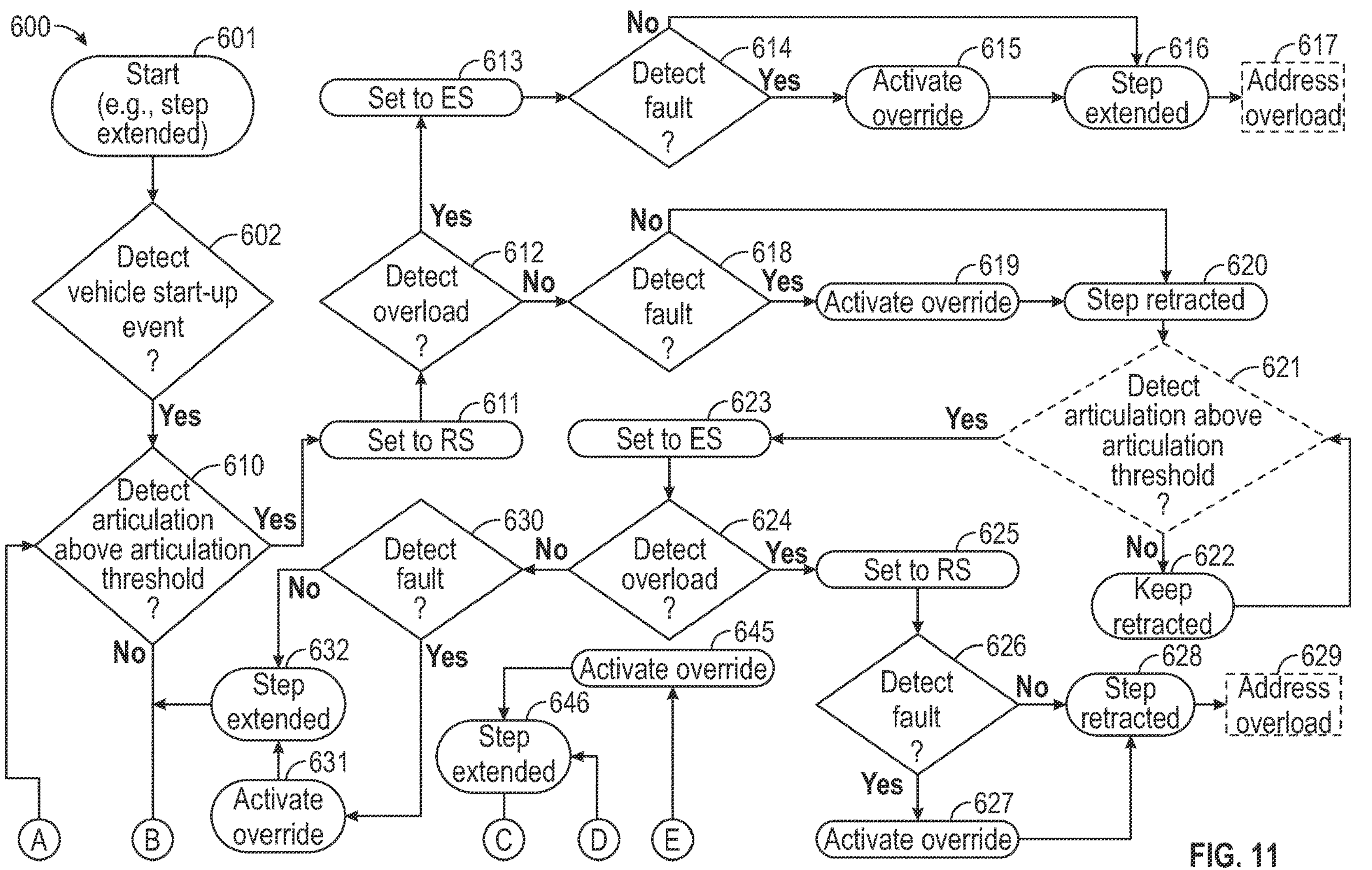
FIG. 11 is a flow chart illustrating an example method of controlling a cab step system, according to an exemplary embodiment.
Figure 11:
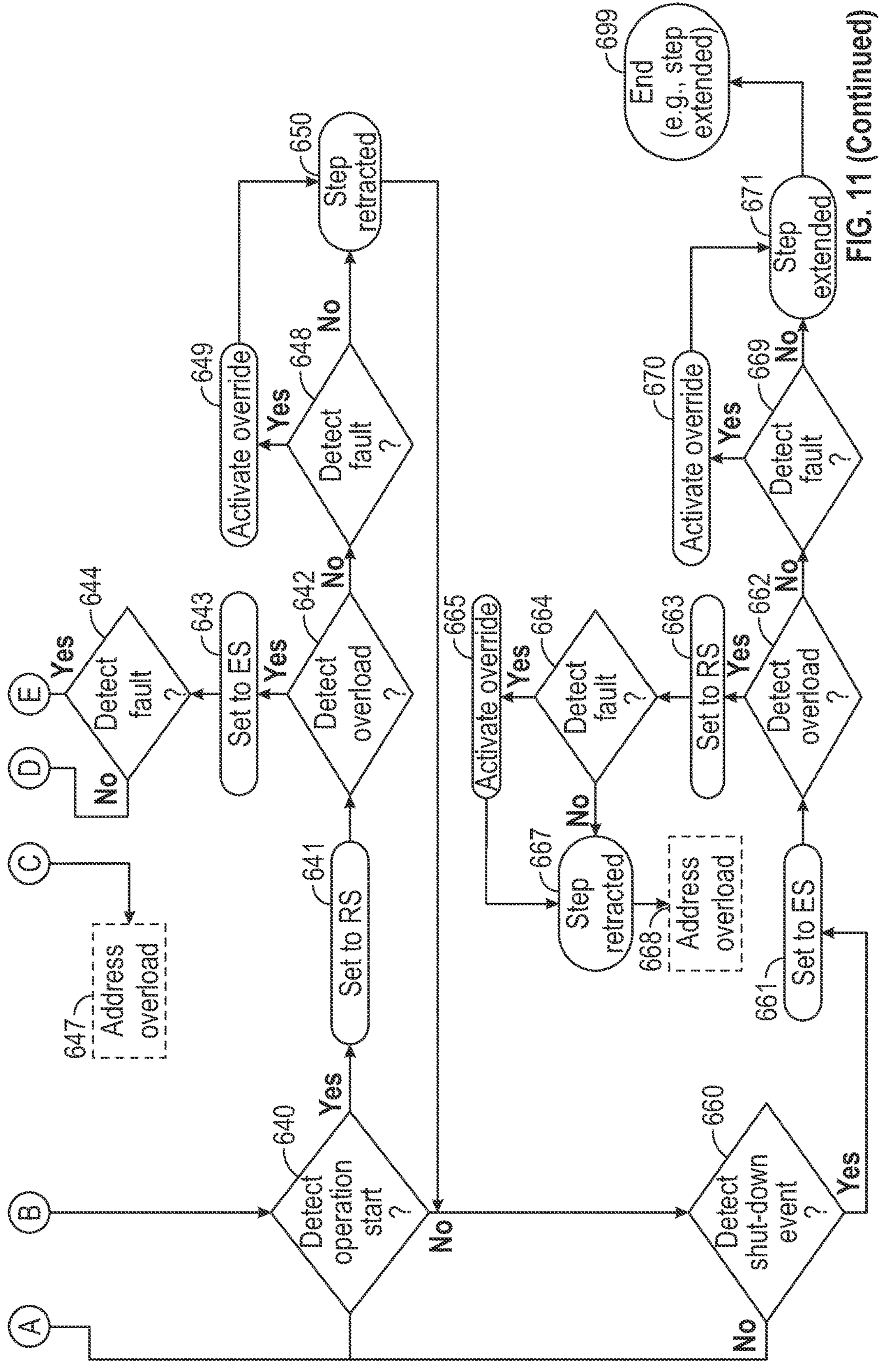

Turning to FIG. 11, a flowchart illustrating an exemplary method 600 for controlling a cab step system 400 is shown. The method 600 may be performed by the cab step controller 200 and/or the cab step control system 500. As used in FIG. 11, "RS" may refer to the retracted state 404 and "ES" may refer to the extended state 408 of the staircase 403.

The method 600 may begin upon start-up of the vehicle 10 or upon detection of an articulation angle of the vehicle 10. Similarly, the method 600 may end when upon shut-off of the vehicle 10. In some embodiments, the method 600 may end by being toggled off (e.g., by a switch on the operator interface 40, based on the override subassembly 440 being activated, based on an input received via the controller 200, etc.). Generally, the method 600 is configured to position the cab step system 400 in the retracted state 404 in response to the articulation angle of the vehicle 10 exceeding the articulation threshold and/or the vehicle 10 conducting an operation event (e.g., shifting out of park, moving, performing a crop collecting operation, etc.). In this way, the method 600 generally raises the cab step system 400 while the vehicle 10 is operating, so that the staircase 403 does not contact an obstacle or the vehicle 10, etc. Similarly, the method 600 is generally configured to position the cab step system 400 in the extended state 408 when the operator is expected to enter/leave the vehicle 10 (e.g., when the vehicle 10 is powered off, when the vehicle 10 is in park and the articulation angle is below the articulation threshold, etc.). While the method 600 includes various possible steps illustrated in FIG. 11, the steps shown and discussed below may be omitted, repeated, performed in a different order, performed with additional steps intervening, and the like. All such combinations and variations of the method 600, especially those exemplified by the various example cases and functionalities discussed herein, are contemplated by this disclosure.

At step 601, the method 600 may generally start with the cab step system 400 in the extended state 408 and the vehicle 10 powered off, in a dormant state, in park, or the like. In this way, while the vehicle 10 is dormant/not in use, the staircase 403 may be extended such that an operator may more easily enter the vehicle 10, the clearance height is set to the minimum clearance height 434, etc. In other embodiments, the method 600 may start with the cab step system 400 in the retracted state 404. The vehicle 10 and/or the cab step system 400 may detect an operator's approach and, in response, move the cab step system 400 to the extended state 408. For example, the cab step system 400 may include a wireless fob, a remote activator/control, a proximity/motion detector, or the like to detect the proximity of the operator and move the cab step system 400 to the extended state 408 based on a received signal and/or based on the operator being within a distance threshold of the vehicle 10. In still further embodiments, a switch, lever, button, or the like may be activated to move the cab step system 400 to the extended state 408 at the start of the method 600.

At step 602, the method 600 may include detecting a vehicle start-up event. Vehicle start up events may include at least one of: an operator sitting in a seat of the cab 30, keys of the vehicle 10 turning to a run position, keys of the vehicle 10 entering the cab 30 and/or being inserted into the vehicle 10, starting of the prime mover 52, or the like. Prior to detecting the vehicle start up-event, the cab step system 400 may be set to a dormant state, a low power state, an energy-saving state, or the like. Further, prior to detecting the vehicle start up event, the cab step system 400 may remain in the extended state 408. Upon detecting the vehicle start-up event, the cab step system 400 may enter a powered state, a ready state, or the like. For example, in embodiments where the actuator 417 includes a pressurized drive unit 419 or a drive unit 419 that operates via a battery or energy cell, the actuator 417 may wait to pressurize the drive unit 419 or draw energy from the battery/energy cell until after detecting the vehicle start-up event. In this way, step 602 of detecting the vehicle start-up event may extend the longevity of the cab step system 400 by increasing the downtime of components thereof and/or reducing the energy consumption of the cab step system 400. Additionally, the step 602 of detecting a vehicle start-up event may prevent the cab step system 400 from moving the staircase 403 to the retracted state 404 at an unintended time (e.g., while an operator is merely performing maintenance on the exterior of the vehicle 10, while an operator is merely momentarily entering the cab 30, etc.). Accordingly, the step 602 may save operator time and improve the efficiency of the method 600 (e.g., by preventing the staircase 403 from moving to the retracted state 404 when the operator enters the cab 30 merely to retrieve a forgotten item—thereby saving the operator's time by allowing the operator to exit without waiting for the staircase 403 to extend, etc.).

At step 610, the method 600 may include detecting an articulation of the vehicle 10 above an articulation threshold. The detected articulation may include a degree that a steering wheel of the vehicle 10 is turned (e.g., turned to the left), a sharpness of a turn indicated by a guidance system of the vehicle 10, a minimum angle of the tractive elements and/or tractive assembly, or any other suitable indication from the staircase 403 or a component of the vehicle 10 indicating that the vehicle 10 has shifted/turned/travelled at an angle sufficient to exceed the articulation threshold. For example, an accelerometer, speedometer, or the like may be used to determine a speed/character of a turn and back-calculate or estimate the articulation angle of the vehicle 10. The articulation threshold may be calibrated to detect only an articulation angle or an articulation degree in a specific direction. For example, the articulation threshold may be set to at least 45 degrees to the left (e.g., a turn, wheel angle, articulation angle, etc. of 45 degrees to the right would not meet or exceed the articulation threshold). By detecting an articulation above the articulation threshold even before the vehicle 10 begins operations (e.g., before the vehicle 10 moves, while the vehicle 10 is still in park, etc.), the method 600 prevents a component or portion of the vehicle 10 from colliding with the cab step system 400 while the staircase 403 is in the extended state 408. Specifically, when the articulation angle meets or exceeds the articulation threshold at step 610, the method 600 may proceed to step 611.

Step 611 through step 620 provide one detailed example of a series of steps and/or operations that may be performed to set the cab step system 400 to a target state (e.g., the retracted state 404 or the extended state 408). For example, the operations may include performing a fault mitigation operation while moving the cab step system 400 towards the target state (e.g., detecting an overload event, detecting a fault event, activating the override subassembly 440, and/or otherwise taking corrective action as discussed herein). In response to the fault mitigation operation detecting an overload event, the cab step system 400 may return to the starting state (e.g., a first state) and require the cab system stem 400 and/or an operator to address the overload event as described below. In response to detecting a fault event, the cab step system 400 (e.g., automatically) and/or an operator may activate the override subassembly 440 to move the cab step system 400 to a designated state.

At step 611, the method 600 may include setting the cab step system 400 to the retracted state 404 and moving the staircase 403 towards the retracted state 404 (e.g., to avoid collision between a component of the vehicle 10 and the staircase 403). Setting the cab step system 400 to the retracted state 404 (and/or the extended state 408) may include initiating movement of the staircase 403 through various of the transition states 406 and may conclude when the staircase 403 reaches the respective retracted state 404, extended state 408, or experiences one or more of a fault event, overload event, and/or an override activation. For example, at step 611, the staircase 403 may move (e.g., raise) from the extended state 408 to the retracted state 404 and may stop movement upon receipt by the controller 200 of a first signal indicating that the staircase 403 is in the retracted state 404. For example, a proximity switch (e.g., a proximity sensor 450) may activate when the retractable step 414 is proximate the platform 402 or the like. The first signal may indicate that the step of moving the staircase 403 to the retracted state 404 is complete. In some embodiments, a second signal may be received to confirm the position of the staircase 403 or may not be received to indicate that a fault event has occurred (e.g., the staircase 403 did not fully move towards the intended state, moved to the intended state but subsequently shifted/lost its position, or the like). For example, the second signal may be received from a limit switch (e.g., a second sensor 450) adjacent to, coupled to, abutting, etc. the platform 402, a guide track 438, or a similar component such that the limit switch only sends a signal if the staircase 403 is fully positioned in the extended state 408, the retracted state 404, a designated transition state 406, etc. In this way, multiple signals (e.g., a first signal from a proximity sensor/switch and a second signal from a mechanical limit switch) may be used to confirm the position of the staircase, detect faults in the method 600, and allow the method 600 to proceed to appropriate corrective method steps.

Additionally, the step 610 and other steps of setting the cab step system 400 to the retracted state 404 and/or the extended state 408 may be performed in combination with, in sequence with, in unison with, etc. one or more steps of detecting an overload event, detecting a fault event, resetting the cab step system 400 to the respective retracted state 404 or the extended state 408, activating the override subassembly 440, or any combination or variation thereof. A non-limiting and non-exhaustive list of example overload detection, fault detection, state reset, and override activation steps are illustrated in the flowchart of FIG. 11. It should be understood that any or all of these steps may be varied, modified, combined, performed in a different order, performed with additional intervening steps, omitted, or any combination or variation thereof.

For example, at step 612, the method 600 may include detecting an overload event while the staircase 403 attempts to move and/or moves from the extended state 408 to the retracted state 404. The step 612 of detecting an overload event may be performed by one or more sensors 450 and/or the controller 200 of the cab step system 400. An overload event may include events such as the staircase 403 being unable to move to the designated state, the staircase 403 becoming stuck at a transition state 406, a load/force exceeding a maximum load threshold on the actuator 417, an obstacle/blockage/debris blocking movement of the cab step system 400, a weight above a weight threshold being attached/placed/located on the staircase 403 as the staircase 403 attempts to change states, or the like. In this way, step 612 (and other like steps) of detecting the overload event may prevent the cab step system 400 from changing states when a condition exists that could potentially cause damage to the cab step system 400, a component of the vehicle 10, etc. For example, at step 612, a branch, loose vehicle component, or other piece of debris may enter the operating range of the actuator 417 and cause the staircase 403 to be unable to move to the retracted state 404. A load cell on the actuator 417 may detect a force above a force threshold as the actuator 417 or a component of the cab step system 400 contacts the obstacle and continues to attempt to move towards the retracted state 404. Accordingly, the cab step system 400, the controller 200, etc. may detect the overload event and the method 600 may proceed to step 613.

At step 613, the method 600 may include resetting the cab step system 400 to the respective extended state 408 and/or the retracted state 404 in response to detecting an overload event. In this way, the cab step system 400 may attempt to return to a first state and repeat the attempt to move to a second state. Here, after detecting an overload event while moving to the retracted state 404, the cab step system 400 may return to the extended state 408 and repeat the attempt to move to the retracted state 404 or wait for further corrective action (e.g., an operator input, an activation of the override subassembly 440, etc.).

Alternatively, or additionally, the method 600 may include, upon detecting an overload event, temporarily disabling one or more features of the vehicle 10. For example, upon detecting an articulation above an articulation threshold at step 610 and attempting to move the staircase 403 to the retracted state 404, an overload event may occur that prevents the staircase 403 from reaching the retracted state 404. Accordingly, the method 600 may include disabling vehicle 10 steering, disabling a FNRP controller of the vehicle 10, locking the vehicle 10 in park, or the like for a designated amount of time, until a designated condition occurs, or until an operator addresses the overload event (e.g., removes a blockage from the cab step system 400, selects an "all-clear" button on an input device, activates the override subassembly, etc.). By temporarily disabling one or more features of the vehicle 10, the method 600 may prevent operation of the vehicle 10 in a state (e.g., after an overload state, when a fault occurs to prevent full movement of the staircase 403, etc.) that may result in a collision between the vehicle 10, the cab step system 400, and/or another object. Thus, at step 613, the method 600 may include setting the cab step system 400 to the extended state 408 to address the overload event detected at step 612.

Like the various steps of detecting an overload event, the method 600 may also include various steps such as step 614 of detecting a fault event. A fault event may include events such as the staircase 403 approaching (e.g., coming within 1 inch, 2 inches, 0.5 inches) but not fully reaching the intended state, the staircase 403 reaching the intended state then subsequently becoming dislodged/jostled/otherwise moved out of the intended state, or any other event indicating a possible inconsistency/uncertainty in the position of the staircase 403 (e.g., receiving a first signal from a proximity sensor 450 indicating that the staircase 403 is in the retracted state 404 but failing to receive a confirmatory second signal from a limit switch indicating/confirming that the staircase 403 is in the retracted state 404) or the like. Accordingly, at step 614, the method 600 may include detecting a fault event such as, for example, a fault event that occurs while the cab step system 400 attempts to lower the staircase 403 back to the extended state 408 after detecting an overload event at step 612. Specifically, the staircase 403 may be unable to fully return to the extended state 408 (e.g., the staircase 403 may only partially extend) as indicated by a failure to receive a signal from a limit switch indicating that that the staircase 403 has moved to a position corresponding to the extended state 408. Upon detecting a fault event at step 614, the method 600 may proceed to step 615.

At step 615, and at other similar steps (e.g., upon detecting a fault event and/or an override event), the method 600 may include activating the override subassembly 440. The step of activating the override subassembly 440 may result in mechanically adjusting the staircase 403 to the appropriate/intended state when one or more of the overload event, fault event, or other events indicating uncertainty in the position of the staircase 403 occur. In some embodiments, the controller 200 and/or the cab step system 400 may automatically activate the override subassembly 440, for example, to cause a mechanical override of the actuator 417 and to ensure that the staircase 403 is in the intended state. In other embodiments, the cab step system 400 may send a prompt to a user interface and receive a subsequent user input (e.g., manual activation) of the override subassembly 440. The prompt may include text shown on a user display, an audio prompt, a vibration or other haptic prompt, a light illumination, etc. The method 600 may further include limiting the functionality of the vehicle 10 until the override subassembly 440 is activated or until a user bypasses the prompt (e.g., selects an "all clear" or "ignore" button). At the conclusion of step 615 and following activation of the override subassembly 440 to move the staircase 403 to, in this instance, the extended state 408, the method may proceed to step 616 where the step returns to the extended state 408.

If a fault is not detected at step 614 (e.g., the staircase 403 successfully returns to the extended state 408 after the overload event at step 612 prevents the staircase 403 from reaching the retracted state 404), then the staircase reaches the extended state 408 and the method proceeds directly to step 616 from step 614.

At step 615, and at other similar steps (e.g., upon detecting a fault event and/or an override event), the method 600 may include activating the override subassembly 440. The step of activating the override subassembly 440 may result in mechanically adjusting the staircase 403 to the appropriate/intended state when one or more of the overload event, fault event, or other events indicating uncertainty in the position of the staircase 403 occur. In some embodiments, the controller 200 and/or the cab step system 400 may automatically activate the override subassembly 440, for example, to cause a mechanical override of the actuator 417 and to ensure that the staircase 403 is in the intended state. In other embodiments, the cab step system 400 may send a prompt to a user interface and receive a subsequent user input (e.g., manual activation) of the override subassembly 440. The prompt may include text shown on a user display, an audio prompt, a vibration or other haptic prompt, a light illumination, etc. The method 600 may further include limiting the functionality of the vehicle 10 until the override subassembly 440 is activated or until a user bypasses the prompt (e.g., selects an "all clear" or "ignore" button). At the conclusion of step 615 and following activation of the override subassembly 440 to move the staircase 403 to, in this instance, the extended state 408, the method may proceed to step 616 where the step returns to the extended state 408.

In some embodiments, an operator and/or the cab step system 400 may be configured to allow an override event to occur at any instance. In other words, in some embodiments, an operator may at any time activate the override subassembly to manually move the staircase 403 (e.g., an overload event or a fault event is not necessarily a prerequisite for activation of the override subassembly 440). In this way, the cab step system 400 and the method 600 may allow for a manual override via the override subassembly 440 and manual setting of the staircase to a designated state (e.g., the retracted state 404, the extended state 408, a transition state 406 and/or a target transition state 406, etc.) at any time.

At step 616, the method 600 may include moving the step back to the extended state 408 upon detecting an overload event at step 612. Subsequently, the method 600 may proceed to step 617 which may include addressing the overload event. The overload event may be addressed in a variety of ways and the manner of addressing the overload event may differ depending on whether the staircase 403 is in the retracted state 404, the extended state 408, or a transition state 406. For example, if the overload event occurs and the staircase 403 is in the retracted state 404, the method may include proceeding with operation of the vehicle 10, ending the method 600, or allowing an operator to address the overload event (e.g., by activating the override subassembly 440 to manually move the staircase 403). In this way, an overload event that retains the staircase 403 in the retracted event may be less severe or may not require action compared to overload events that leave the staircase 403 in a different state. This is because, in the retracted state 404, the staircase 403 is at its most compact, is least likely to collide with the vehicle 10 or another object, and is still usable by the operator although requiring a slightly steeper ascent/descent. If the overload event occurs and the staircase is left in the extended state 408 and/or the retracted state 404, the method 600 may include automatically activating the override subassembly 440 to bring the staircase 403 to the retracted state, disabling one or more functionalities of the vehicle 10 (e.g., locking the vehicle 10 in park, preventing steering of the vehicle 10 above the articulation threshold, displaying a warning on the operator interface 40, setting the vehicle 10 to a low speed mode, requiring/notifying an operator to inspect the cab step system 400, etc.). In this way, the method 600 may reduce the likelihood of operation of the vehicle 10 and/or movement of the vehicle 10 while the staircase 403 is in an undesirable state (e.g., the extended state 408 during movement, etc.).

At steps 618, the method 600 may include detecting a fault event. This step may be similar to step 614 discussed above. For example, the method 600 may include detecting that the staircase 403 has approached the retracted state 404 but has become dislodged or has not fully reached the retracted state 404. Accordingly, if no fault is detected, the method 600 may proceed to step 620 and the step is in the retracted state 404. If a fault is detected, the method 600 may proceed to step 619 and the override subassembly 640 may be activated to move the staircase 403 to the retracted state 404.

At step 621, the method 600 may include detecting whether the articulation of the vehicle 10 remains above the articulation threshold and/or detecting that the articulation of the vehicle 10 falls below the articulation threshold. In this way, when the vehicle 10 is directed back towards a straight driving path, to a right turn (e.g., is turned more to the right such that the vehicle 10 no longer exceeds the articulation threshold) and the vehicle 10 is not moving, the method 600 may proceed to step 623 of setting the staircase 403 back to the extended state 408. In this way, while the vehicle 10 is stationary, the staircase 403 retracts to prevent the tractive elements from colliding with the staircase 403 if the vehicle 10 is turned, and subsequently extends if the wheel is adjusted back towards a straight position. If the articulation angle remains above the articulation threshold (e.g., the controls of the vehicle 10 continue to angle the tractive elements in the direction of a left turn), the method 600 may proceed to step 622 and keep the staircase 403 in the retracted state 404. If the vehicle 10 subsequently begins operation, the staircase 403 may remain in the retracted state and perform the step 640-699 discussed below.

At step 623 through step 632, the method may include one or more analogous, although possibly different, operations to those performed in step 611 through step 620 discussed above. For example, the method 600 may include setting the staircase 403 to the extended state 408 (rather than the retracted state 404 with respect to steps 611-620) and may include a series of steps and/or operations that may be performed to set the cab step system 400 to the target state (e.g., the extended state 408). For example, the operations may include performing a fault mitigation operation while moving the cab step system 400 towards the target state (e.g., detecting an overload event, detecting a fault event, activating the override subassembly 440, and/or otherwise taking corrective action as discussed herein). In response to the fault mitigation operation detecting an overload event, the cab step system 400 may return to the starting state (e.g., the retracted state 404) and require the cab system stem 400 and/or an operator to address the overload event or may ignore the overload event and leave the staircase 403 in the retracted state 404. In response to detecting a fault event, the cab step system 400 (e.g., automatically) and/or an operator may activate the override subassembly 440 to move the cab step system 400 to a designated state (e.g., the retracted state 404, the extended state 408, etc.). These steps may conclude with addressing an overload event at step 629 or when the staircase 403 reaches the extended state 408 in step 632.

At step 640, the method 600 may include detecting an operation start and/or an operation even of the vehicle 10. The operation start and/or the operation event of the vehicle 10 may indicate that the staircase 403 should be moved to the retracted state 404 (e.g., to meet a homologation requirement, to reduce the likelihood that the staircase 403 collides with an object or the ground, etc.). The operation start and/or the operation event may include detecting and/or receiving a signal that the vehicle 10 is moved out of a park state and into one or more states allowing movement of the vehicle 10. For example, the operation start event may include adjustment of the FNRP shuttle lever out of park, moving the vehicle 10 to a designated gear, detecting motion of the vehicle 10 or a component thereof, or the like. Other operation start events may include a seatbelt buckling, one or more signals being activated, a navigation route being entered/toggled, or the like. Upon detecting an operation start and/or an operation event of the vehicle 10, the method 600 may proceed to step 641 through step 650.

At step 641 through step 650, the method 600 may include one or more analogous, and possibly different, operations to those performed in step 611 through step 620 and/or step 623 through step 632 discussed above. For example, the method 600 may include setting the staircase 403 to the retracted state 404 and may include a series of steps and/or operations that may be performed to set the cab step system 400 to the target state (e.g., the retracted state 404). For example, the operations may include performing a fault mitigation operation while moving the cab step system 400 towards the target state (e.g., detecting an overload event, detecting a fault event, activating the override subassembly 440, and/or otherwise taking corrective action as discussed herein). In response to the fault mitigation operation detecting an overload event, the cab step system 400 may return to the starting state (e.g., the extended state 408) and require the cab system stem 400 and/or an operator to address the overload event. In response to detecting a fault event, the cab step system 400 (e.g., automatically) and/or an operator may activate the override subassembly 440 to move the cab step system 400 to a designated state (e.g., the retracted state 404, the extended state 408, etc.). These steps may conclude with addressing an overload event at step 647 or when the staircase 403 reaches the retracted state 404 in step 650.

At step 660, the method 600 may include detecting a shut-down event and/or detecting an end to an operation. Upon detecting a shut-down event and/or an end to the operation, and while the articulation angle remains below the articulation threshold, the vehicle 10 may perform steps 661 through steps 671 of moving the staircase 403 to the extended state 408 (e.g., to allow an operator to more easily exit the cab 30 following the conclusion of the operation of the vehicle 10). The shut-down event and/or the end of the operation may include setting the vehicle in the park state, powering off the prime mover of the vehicle 10, or the like.

At step 661 through step 671, the method may include one or more analogous, although possibly different, operations to those performed in step 611 through step 620, step 623 through step 632, and/or step 641 through step 650 discussed above. For example, the method 600 may include setting the staircase 403 to the extended state 408 (similar to steps 623-632) and may include a series of steps and/or operations that may be performed to set the cab step system 400 to the target state (e.g., the extended state 408). For example, the operations may include performing a fault mitigation operation while moving the cab step system 400 towards the target state (e.g., detecting an overload event, detecting a fault event, activating the override subassembly 440, and/or otherwise taking corrective action as discussed herein). In response to the fault mitigation operation detecting an overload event, the cab step system 400 may return to the starting state (e.g., the retracted state 404) and require the cab system stem 400 and/or an operator to address the overload event or may ignore the overload event and leave the staircase 403 in the retracted state 404. In response to detecting a fault event, the cab step system 400 (e.g., automatically) and/or an operator may activate the override subassembly 440 to move the cab step system 400 to a designated state (e.g., the retracted state 404, the extended state 408, etc.). These steps may conclude with addressing an overload event at step 668 or when the staircase 403 reaches the extended state 408 in step 671.

At step 669, the method 600 may conclude with the staircase 403 being locating in the extended state 408 to allow the operator to move easily exit the vehicle 10. The staircase 403 may remain in the extended state 408 until a subsequent performance of the method 600, may return to the retracted state 404 after spending a designated amount of time in the dormant position, may be manually set to the retracted state 404, or the like.

Further, as shown by line (A), the method 600 and/or the cab step system 400 may operate in feedback communication with one or more of the sensors 450. For example, the cab step system 400 may continuously determine the position of the staircase 403, whether the articulation angle is above the articulation threshold, whether the vehicle 10 is operating, or the like and move the staircase 403 to a designated state.

As utilized herein with respect to numerical ranges, the terms "approximately," "about," "substantially," and similar terms generally mean +/−10% of the disclosed values, unless specified otherwise. As utilized herein with respect to structural features (e.g., to describe shape, size, orientation, direction, relative position, etc.), the terms "approximately," "about," "substantially," and similar terms are meant to cover minor variations in structure that may result from, for example, the manufacturing or assembly process and are intended to have a broad meaning in harmony with the common and accepted usage by those of ordinary skill in the art to which the subject matter of this disclosure pertains. Accordingly, these terms should be interpreted as indicating that insubstantial or inconsequential modifications or alterations of the subject matter described and claimed are considered to be within the scope of the disclosure as recited in the appended claims.

It should be noted that the term "exemplary" and variations thereof, as used herein to describe various embodiments, are intended to indicate that such embodiments are possible examples, representations, or illustrations of possible embodiments (and such terms are not intended to connote that such embodiments are necessarily extraordinary or superlative examples).

The term "coupled" and variations thereof, as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using a separate intervening member and any additional intermediate members coupled with one another, or with the two members coupled to each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

References herein to the positions of elements (e.g., "top," "bottom," "above," "below") are merely used to describe the orientation of various elements in the figures. It should be noted that the orientation of various elements may differ according to other exemplary embodiments, and that such variations are intended to be encompassed by the present disclosure.

The hardware and data processing components used to implement the various processes, operations, illustrative logics, logical blocks, modules, and circuits described in connection with the embodiments disclosed herein may be implemented or performed with a general purpose single- or multi-chip processor, a digital signal processor (DSP), an application specific integrated circuit (ASIC), a field programmable gate array (FPGA), or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some embodiments, particular processes and methods may be performed by circuitry that is specific to a given function. The memory (e.g., memory, memory unit, storage device) may include one or more devices (e.g., RAM, ROM, Flash memory, hard disk storage) for storing data and/or computer code for completing or facilitating the various processes, layers and modules described in the present disclosure. The memory may be or include volatile memory or non-volatile memory, and may include database components, object code components, script components, or any other type of information structure for supporting the various activities and information structures described in the present disclosure. According to an exemplary embodiment, the memory is communicably connected to the processor via a processing circuit and includes computer code for executing (e.g., by the processing circuit or the processor) the one or more processes described herein.

The present disclosure contemplates methods, systems, and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures and description may illustrate a specific order of method steps, the order of such steps may differ from what is depicted and described, unless specified differently above. Also, two or more steps may be performed concurrently or with partial concurrence, unless specified differently above. Such variation may depend, for example, on the software and hardware systems chosen and on designer choice. All such variations are within the scope of the disclosure. Likewise, software implementations of the described methods could be accomplished with standard programming techniques with rule-based logic and other logic to accomplish the various connection steps, processing steps, comparison steps, and decision steps.

It is important to note that the construction and arrangement of the vehicle 10 and the systems and components thereof (e.g., the driveline 50, the braking system 92, the cab step system 400, etc.) as shown in the various exemplary embodiments is illustrative only. Additionally, any element disclosed in one embodiment may be incorporated or utilized with any other embodiment disclosed herein.

What is claimed is:

1. A cab step system for a vehicle, the system comprising:
- a platform coupled to the vehicle;
- a staircase selectively moveable between a retracted state and an extended state, the staircase comprising:
  - a plurality of steps including a retractable step,
  - at least one support segment coupling together the steps of the plurality of steps,
- a linkage system, the linkage system comprising:
  - an actuator configured to selectively move the staircase from the retracted state to the extended state;
  - at least one sensor configured to detect a state of the staircase and a condition of the vehicle;
  - a moveable extension bracket coupling the staircase to the platform;
- a controller, the controller comprising one or more processors including one or more memory devices coupled to the one or more processors, the one or more memory devices configured to store instructions thereon that, when executed by the one or more processors, cause the one or more processors to:
  - receive a first indication that the staircase is in at least one of the retracted state or the extended state,
  - receive a second indication of an articulation angle of the vehicle,
  - compare the articulation angle to an articulation angle threshold,
  - in response to the articulation angle exceeding the articulation angle threshold, cause the staircase to move to or stay in the retracted state,
  - receive a third indication of a vehicle operation event, in response receiving the third indication of the vehicle operation event, cause the staircase to move to or stay in the retracted state, receive a fourth indication of a vehicle shut-down event, and in response to receiving the fourth indication of the vehicle shut-down event and the articulation angle falling below the articulation angle threshold, cause the staircase to move to or stay in the extended state.

2. The cab step system of claim 1, wherein:

the condition of the vehicle includes the articulation angle of a tractive assembly of the vehicle;

the at least one sensor comprises:

a proximity sensor configured to receive a fifth indication of a distance between the staircase and the platform, a limit switch configured to receive a sixth indication that the staircase is in the retracted state or the extended state, an articulation sensor configured to receive the second indication of the articulation angle; and the first indication that the staircase is in at least one of the retracted state or the extended state is based on the fifth indication of the proximity sensor and the sixth indication of the limit switch.

3. The system of claim 2, further comprising:

an overload sensor configured to receive a seventh indication of a load on the linkage system;

wherein the one or more memory devices are configured to store further instructions thereon that, when executed by the one or more processors, cause the one or more processors to:

receive the seventh indication of the load on the linkage system, compare the seventh indication with an overload threshold, and in response to the seventh indication exceeding the overload threshold, reset the staircase to one of the retracted state or the extended state.

4. The system of claim 3, wherein the one or more memory devices are configured to store further instructions thereon that, when executed by the one or more processors, cause the one or more processors to:

detect a fault event based on the at least one of the fifth indication of the proximity sensor or the sixth indication of the limit switch, and in response to detecting the fault event, activate an override subassembly to move the staircase to one of the retracted state or the extended state.

5. The system of claim 1, wherein the vehicle operation event comprises at least one of shifting the vehicle out of a parked state, moving the vehicle via a prime mover, or performing a crop collecting operation via the vehicle.

6. The system of claim 1, wherein the vehicle shut-down event comprises at least one of shifting the vehicle to a park state, powering off a prime mover of the vehicle.

7. The system of claim 6, wherein the one or more memory devices are configured to store further instructions thereon that, when executed by the one or more processors, cause the one or more processors to:

set the linkage system to one of a low power state or a high power state, detect a vehicle start-up event comprising at least one of an operator being located in a seat of a cab of the vehicle, a key of the vehicle turning to a run position, the key of the vehicle entering the cab, the key of the vehicle being inserted into the vehicle, or a start of the prime mover, after detecting the vehicle start-up event, set the linkage system to the high power state, and after detecting the vehicle shut-down event, set the linkage system to the low power state.

8. A vehicle comprising:

a frame;

a front tractive assembly coupled to the frame, the front tractive assembly including a front axle;

a rear tractive assembly coupled to the frame, the rear tractive assembly including a rear axle;

a prime mover coupled to the frame and configured to drive the front tractive assembly and the rear tractive assembly to propel the vehicle;

an articulation sensor configured to collect data indicating an articulation angle of at least one of the front tractive assembly or the rear tractive assembly;

a platform coupled to the frame of the vehicle;

a staircase selectively moveable between a retracted state and an extended state, the staircase comprising:

a plurality of steps including a retractable step, at least one support segment coupling together the steps of the plurality of steps, a linkage system, the linkage system comprising:

an actuator configured to selectively move the staircase from the retracted state to the extended state;

at least one sensor configured to detect a state of the staircase;

a moveable extension bracket coupling the staircase to the platform;

a controller, the controller comprising one or more processors including one or more memory devices coupled to the one or more processors, the one or more memory devices configured to store instructions thereon that, when executed by the one or more processors, cause the one or more processors to:

receive a first indication that the staircase is in at least one of the retracted state or the extended state, receive a second indication of the articulation angle of the vehicle, compare the articulation angle to an articulation angle threshold, in response to the articulation angle exceeding the articulation angle threshold, cause the staircase to move to or stay in the retracted state, receive a third indication of a vehicle operation event, in response receiving the third indication of the vehicle operation event, cause the staircase to move to or stay in the retracted state, receive a fourth indication of a vehicle shut-down event, and in response to receiving the fourth indication of the vehicle shut-down event and the articulation angle falling below the articulation angle threshold, cause the staircase to move to or stay in the extended state.

9. The vehicle of claim 8, wherein:

the at least one sensor comprises:

a proximity sensor configured to receive a fifth indication of a distance between the staircase and the platform, a limit switch configured to receive a sixth indication that the staircase is in the retracted state or the extended state; and the first indication that the staircase is in at least one of the retracted state or the extended state is based on the fifth indication of the proximity sensor and the sixth indication of the limit switch.

10. The vehicle of claim 9, further comprising:
- an overload sensor configured to receive a seventh indication of a load on the linkage system;
- wherein the one or more memory devices are configured to store further instructions thereon that, when executed by the one or more processors, cause the one or more processors to:
  - receive the seventh indication of the load on the linkage system,
  - compare the seventh indication with an overload threshold, and
  - in response to the seventh indication exceeding the overload threshold, reset the staircase to one of the retracted state or the extended state.

11. The vehicle of claim 10, wherein the one or more memory devices are configured to store further instructions thereon that, when executed by the one or more processors, cause the one or more processors to:
- detect a fault event based on the at least one of the fifth indication of the proximity sensor or the sixth indication of the limit switch, and
- in response to detecting the fault event, activate an override subassembly to move the staircase to one of the retracted state or the extended state.

12. The vehicle of claim 9, wherein the one or more memory devices are configured to store further instructions thereon that, when executed by the one or more processors, cause the one or more processors to:
- detect a fault event based on the at least one of the fifth indication of the proximity sensor or the sixth indication of the limit switch, and
- in response to detecting the fault event, activate an override subassembly to move the staircase to one of the retracted state or the extended state.

13. The vehicle of claim 9, wherein:
- the vehicle operation event comprises at least one of shifting the vehicle out of a parked state, moving the vehicle via the prime mover, or performing a crop collecting operation via the vehicle; and
- the vehicle shut-down event comprises at least one of shifting the vehicle to a park state, powering off the prime mover of the vehicle.

14. The vehicle of claim 13, wherein the one or more memory devices are configured to store further instructions thereon that, when executed by the one or more processors, cause the one or more processors to:
- set the linkage system to one of a low power state or a high power state,
- detect a vehicle start-up event comprising at least one of an operator being located in a seat of a cab of the vehicle, a key of the vehicle turning to a run position, the key of the vehicle entering the cab, the key of the vehicle being inserted into the vehicle, or a start of the prime mover,
- after detecting the vehicle start-up event, set the linkage system to the high power state, and
- after detecting the vehicle shut-down event, set the linkage system to the low power state.

15. A method for operating a cab step system of a vehicle, the method comprising:
- receiving, by a controller, a first indication of a state of a staircase of the vehicle, the staircase coupled to a platform of the vehicle and selectively moveable between a retracted state and an extended state;
- receiving, by the controller, a second indication of an articulation angle of a tractive element of the vehicle;
- comparing, by the controller, the articulation angle to an articulation angle threshold;
- in response to the articulation angle exceeding the articulation angle threshold, causing, by the controller, the staircase to move to or stay in the retracted state;
- receiving, by the controller, a third indication of a vehicle operation event;
- in response receiving the third indication of the vehicle operation event, causing, by the controller, the staircase to move to or stay in the retracted state;
- receiving, by the controller, a fourth indication of a vehicle shut-down event; and
- in response to receiving the fourth indication of the vehicle shut-down event and the articulation angle falling below the articulation angle threshold, causing, by the controller, the staircase to move to or stay in the extended state.

16. The method of claim 15, further comprising:
- receiving, by the controller, a fifth indication of a distance between the staircase and the platform;
- receiving, by the controller, a sixth indication from a limit switch that the staircase is in the retracted state, the extended state, or a transition state; and
- determining, by the controller, the state of the staircase based on the fifth indication and the sixth indication.

17. The method of claim 16, further comprising:
- receiving, by the controller, a seventh indication of a load on the staircase;
- comparing, by the controller, the seventh indication with an overload threshold; and
- in response to the seventh indication exceeding the overload threshold, resetting, by the controller, the staircase to one of the retracted state or the extended state.

18. The method of claim 17, further comprising:
- detecting, by the controller, a fault event based on at least one of the fifth indication or the sixth indication; and
- in response to detecting the fault event, activating, by the controller, an override subassembly to move the staircase to one of the retracted state or the extended state.

19. The method of claim 15, wherein the vehicle operation event comprises at least one of shifting the vehicle out of a parked state, moving the vehicle via a prime mover, or performing a crop collecting operation via the vehicle; and
- the vehicle shut-down event comprises at least one of shifting the vehicle to the parked state, or powering off the prime mover of the vehicle.

20. The method of claim 19, further comprising:
- setting, by the controller, an actuator to one of a low power state or a high power state;
- detecting, by the controller, a vehicle start-up event comprising at least one of an operator being located in a seat of a cab of the vehicle, a key of the vehicle turning to a run position, the key of the vehicle entering the cab, the key of the vehicle being inserted into the vehicle, or a start of the prime mover;
- after detecting the vehicle start-up event, setting, by the controller, the actuator to the high power state; and
- after detecting the vehicle shut-down event, setting, by the controller, the actuator to the low power state.

* * * * *